United States Patent
Norris et al.

(10) Patent No.: US 8,473,140 B2
(45) Date of Patent: Jun. 25, 2013

(54) NETWORKED MULTI-ROLE ROBOTIC VEHICLE

(75) Inventors: William Robert Norris, Rock Hill, SC (US); James Allard, Newton, MA (US); Jeffery Scott Puhalla, Hawley, MN (US); Kathleen A. Wienhold, Arlington, MA (US)

(73) Assignees: Deere & Company, Moline, IL (US); iRobot Corporation, Bedford, MA (US)

( * ) Notice: Subject to any disclaimer, the term of this patent is extended or adjusted under 35 U.S.C. 154(b) by 988 days.

(21) Appl. No.: 11/584,085

(22) Filed: Oct. 20, 2006

(65) Prior Publication Data

US 2007/0198144 A1 Aug. 23, 2007

Related U.S. Application Data

(60) Provisional application No. 60/729,445, filed on Oct. 21, 2005, provisional application No. 60/729,388, filed on Oct. 21, 2005, provisional application No. 60/780,389, filed on Mar. 8, 2006, provisional application No. 60/838,704, filed on Aug. 18, 2006.

(51) Int. Cl.
    *G05D 1/00* (2006.01)

(52) U.S. Cl.
    USPC .................................. 701/23; 701/24; 701/36

(58) Field of Classification Search
    USPC .................. 701/23–28, 33, 36; 370/464, 466, 370/467, 469
    See application file for complete search history.

(56) References Cited

U.S. PATENT DOCUMENTS

| | | | |
|---|---|---|---|
| 4,155,417 A | 5/1979 | Ziems | |
| 4,202,037 A | 5/1980 | Glaser et al. | |
| 4,297,734 A | 10/1981 | Laishley et al. | |
| 4,361,202 A | 11/1982 | Minovitch | |
| 4,579,209 A | 4/1986 | Pacht | |
| 4,791,544 A | 12/1988 | Gautherin et al. | |

(Continued)

FOREIGN PATENT DOCUMENTS

| | | |
|---|---|---|
| AU | 2006306522 | 11/2011 |
| DE | 3404202 A1 | 5/1987 |

(Continued)

OTHER PUBLICATIONS

Patent Abstracts of Japan, JP 2000094373 A, Apr. 4, 2000, Takahashi Katsunori.

(Continued)

*Primary Examiner* — Khoi Tran
*Assistant Examiner* — Spencer Patton
(74) *Attorney, Agent, or Firm* — Kilpatrick Townsend & Stockton LLP

(57) ABSTRACT

An autonomous vehicle and systems having an interface for payloads that allows integration of various payloads with relative ease. There is a vehicle control system for controlling an autonomous vehicle, receiving data, and transmitting a control signal on at least one network. A payload is adapted to detachably connect to the autonomous vehicle, the payload comprising a network interface configured to receive the control signal from the vehicle control system over the at least one network. The vehicle control system may encapsulate payload data and transmit the payload data over the at least one network, including Ethernet or CAN networks. The payload may be a laser scanner, a radio, a chemical detection system, or a Global Positioning System unit.

25 Claims, 23 Drawing Sheets

U.S. PATENT DOCUMENTS

| | | | |
|---|---|---|---|
| 4,945,647 A | 8/1990 | Beneventano et al. | |
| 4,987,402 A | 1/1991 | Nykerk | |
| 5,170,352 A * | 12/1992 | McTamaney et al. | 701/26 |
| 5,227,973 A | 7/1993 | Marcantonio | |
| 5,245,422 A | 9/1993 | Borcherts et al. | |
| 5,400,864 A | 3/1995 | Winner et al. | |
| 5,455,409 A | 10/1995 | Smith et al. | |
| 5,471,560 A | 11/1995 | Allard et al. | |
| 5,508,689 A | 4/1996 | Rado et al. | |
| 5,511,147 A | 4/1996 | Abdel-Malek | |
| 5,555,503 A | 9/1996 | Kyrtsos et al. | |
| 5,563,478 A | 10/1996 | Sugganuma | |
| 5,602,735 A | 2/1997 | Wada | |
| 5,652,849 A | 7/1997 | Conway et al. | |
| 5,675,229 A | 10/1997 | Thorne | |
| 5,684,696 A | 11/1997 | Rao et al. | |
| 5,715,902 A | 2/1998 | Petrovich et al. | |
| 5,794,164 A | 8/1998 | Beckert et al. | |
| 5,831,826 A | 11/1998 | Van Ryswyk | |
| 5,920,172 A | 7/1999 | Bauer | |
| 5,984,880 A | 11/1999 | Launder et al. | |
| 5,995,883 A | 11/1999 | Nishikado | |
| 6,008,985 A | 12/1999 | Lake et al. | |
| 6,038,496 A | 3/2000 | Dobler et al. | |
| 6,053,270 A | 4/2000 | Nishikawa et al. | |
| 6,055,042 A | 4/2000 | Sarangapani | |
| 6,058,427 A | 5/2000 | Viswanath et al. | |
| 6,088,020 A | 7/2000 | Mor | |
| 6,108,031 A | 8/2000 | King et al. | |
| 6,113,395 A | 9/2000 | Hon | |
| 6,169,940 B1 | 1/2001 | Jitsukata et al. | |
| 6,198,992 B1 | 3/2001 | Winslow | |
| 6,233,504 B1 | 5/2001 | Das et al. | |
| 6,236,916 B1 | 5/2001 | Staub et al. | |
| 6,253,161 B1 | 6/2001 | Arias-Estrada | |
| 6,259,980 B1 | 7/2001 | Peck et al. | |
| 6,321,147 B1 | 11/2001 | Takeda et al. | |
| 6,356,819 B1 | 3/2002 | Winslow | |
| 6,434,462 B1 | 8/2002 | Belvy et al. | |
| 6,445,983 B1 | 9/2002 | Dickson et al. | |
| 6,480,762 B1 | 11/2002 | Uchikubo et al. | |
| 6,535,793 B2 | 3/2003 | Allard | |
| 6,592,412 B1 | 7/2003 | Geil et al. | |
| 6,600,986 B2 | 7/2003 | Steinle et al. | |
| 6,633,800 B1 * | 10/2003 | Ward et al. | 701/2 |
| 6,650,625 B1 | 11/2003 | Norizuki et al. | |
| 6,694,260 B1 | 2/2004 | Rekow | |
| 6,760,654 B2 | 7/2004 | Beck | |
| 6,789,014 B1 | 9/2004 | Rekow et al. | |
| 6,813,557 B2 | 11/2004 | Schmidt et al. | |
| 6,845,297 B2 | 1/2005 | Allard | |
| 6,873,911 B2 | 3/2005 | Nishira et al. | |
| 6,901,319 B1 | 5/2005 | Nelson et al. | |
| 6,927,699 B2 | 8/2005 | Samukawa et al. | |
| 6,950,882 B1 | 9/2005 | Weber et al. | |
| 6,975,246 B1 | 12/2005 | Trudeau | |
| 7,024,278 B2 | 4/2006 | Chiappetta et al. | |
| 7,123,522 B2 | 10/2006 | Ho et al. | |
| 7,188,000 B2 | 3/2007 | Chiappetta et al. | |
| 7,299,057 B2 | 11/2007 | Anderson | |
| 8,020,657 B2 | 9/2011 | Allard et al. | |
| 2001/0018640 A1 | 8/2001 | Matsunaga | |
| 2001/0056544 A1 | 12/2001 | Walker | |
| 2002/0022909 A1 * | 2/2002 | Karem | 701/3 |
| 2002/0035416 A1 | 3/2002 | De Leon | |
| 2002/0104300 A1 | 8/2002 | Hunt | |
| 2002/0110155 A1 | 8/2002 | Pearce et al. | |
| 2002/0136939 A1 | 9/2002 | Grieve et al. | |
| 2002/0169531 A1 | 11/2002 | Kawazoe et al. | |
| 2003/0032335 A1 | 2/2003 | Garnett et al. | |
| 2003/0038842 A1 * | 2/2003 | Peck et al. | 345/763 |
| 2003/0080772 A1 | 5/2003 | Giacomini et al. | |
| 2004/0052047 A1 | 3/2004 | Bresniker | |
| 2004/0061596 A1 | 4/2004 | Egami | |
| 2004/0114584 A1 | 6/2004 | Patz | |
| 2004/0158379 A1 | 8/2004 | Horbaschek | |
| 2004/0168837 A1 | 9/2004 | Michaud et al. | |
| 2004/0193363 A1 | 9/2004 | Schmidt et al. | |
| 2004/0217881 A1 | 11/2004 | Pedyash et al. | |
| 2004/0239490 A1 | 12/2004 | Chiba et al. | |
| 2004/0243285 A1 * | 12/2004 | Gounder | 701/1 |
| 2005/0002419 A1 * | 1/2005 | Doviak et al. | 370/466 |
| 2005/0021195 A1 | 1/2005 | Zeitler et al. | |
| 2005/0021860 A1 * | 1/2005 | Kelly et al. | 709/246 |
| 2005/0092542 A1 | 5/2005 | Turner | |
| 2005/0159870 A1 | 7/2005 | Tohdo et al. | |
| 2005/0264998 A1 | 12/2005 | McCutcheon et al. | |
| 2006/0014439 A1 | 1/2006 | Mundry et al. | |
| 2006/0022625 A1 | 2/2006 | Hampo et al. | |
| 2006/0073761 A1 | 4/2006 | Weiss et al. | |
| 2006/0075176 A1 | 4/2006 | Okamoto | |
| 2006/0214253 A1 * | 9/2006 | Camagna et al. | 257/499 |
| 2006/0237968 A1 | 10/2006 | Chandraskearan | |
| 2006/0267777 A1 | 11/2006 | Moore | |
| 2007/0193798 A1 | 8/2007 | Allard et al. | |
| 2007/0198145 A1 | 8/2007 | Norris et al. | |
| 2007/0219666 A1 | 9/2007 | Filippov et al. | |
| 2009/0125175 A1 | 5/2009 | Park et al. | |
| 2011/0071718 A1 | 3/2011 | Norris et al. | |
| 2012/0046820 A1 | 2/2012 | Allard et al. | |

FOREIGN PATENT DOCUMENTS

| | | |
|---|---|---|
| EP | 1184254 | 3/2002 |
| EP | 14881945 | 12/2004 |
| GB | 2128842 A | 8/1983 |
| JP | 11149315 A | 6/1999 |
| WO | WO 99/05580 | 2/1999 |
| WO | WO 01/26338 A2 | 4/2001 |
| WO | WO 2004/086084 | 10/2004 |
| WO | WO 2007/048003 | 4/2007 |
| WO | WO 2007/048029 | 4/2007 |
| WO | WO 2007/050407 | 5/2007 |

OTHER PUBLICATIONS

Corbett, G.K., et al., "A Human Factors Tested for Ground-Vehicle Telerobotics Research," *Southeastcon '90 Proceedings*, vol. 2, pp. 618-620, 1990.

Shimoga, et al., "Touch and Force Reflection for Telepresence Surgery," *IEEE*, pp. 1049-1050, 1994.

Mair, "Telepresence—The Technology and Its Economic an Social Implications," *IEEE*, pp. 118-124, 1997.

Ohashi et al., "The Sensor Arm and the Sensor Glove II—Haptic Devices for VR Interface," *IEEE*, p. 785, 1999.

Green, P.S., et al., "Telepresence Surgery," *IEEE*, Engeneering in Medicine and Biology, pp. 324-329, May/Jun. 1995.

Naki, et al., "7 DOF Arm Type Haptic Interface for Teleoperation and Virtual Reality Systems," *Proceedings of the 1998 IEEE/RSJ Intl. Conference on Intelligent Robots and Systems*, pp. 1266-1271, 1998.

"Tech Firm Showing Off Gadgets for Consumers," *The Wall Street Journal*, 2001.

"Introducing the iRobot-LE," iRobot Corpation, http://www.irobot.com/ir/index.htm Retrieval Date Dec. 5, 2000.

Department of Energy, Technology Application, "Tactical Robotic Vehicle Aids in Battlefield Surveillance," *NTIS Tech Notes*, Springfield, VA, Dec. 1990.

International Search Report and Written Opinion for PCT/US2006/040800 dated Mar. 1, 2007.

Non-Final Office Action for U.S. Appl. No. 11/584,084, mailed May 7, 2010 (thirty-nine pages).

Non-Final Office Action for U.S. Appl. No. 11/584,097, mailed May 26, 2010 (6 pages).

Amendment and Response to Non-Final Office Action for U.S. Appl. No. 11/584,087, filed Jun. 21, 2010, (33 pages).

Yokokohji, et al., "Operation Modes for Cooperating with Autonomous Functions in Intelligent Teleoperation Systems," (seven pages), IEEE International Workshop on Robot and Human Communication, 1992.

International Search Report and Written Opinion for PCT/US2006/040801 (ten pages), dated Mar. 1, 2007.

International Search Report and Written Opinion for PCT/US2006/041177 (sixteen pages), dated Jun. 11, 2007.

International Search Report and Written Opinion for PCT/US2006/041227 (fifteen pages), dated Jun. 11, 2007.

International Preliminary Report on Patentability for PCT/US2006/040801 (eight pages), dated Apr. 23, 2008.
International Preliminary Report on Patentability for PCT/US2006/041177 (twelve pages), dated Apr. 23, 2008.
International Preliminary Report on Patentability for PCT/US2006/041227 (eleven pages), dated Apr. 23, 2008.
International Preliminary Report on Patentability for PCT/US2006/040800 (seven pages), dated Apr. 23, 2008.
Non-Final Office Action for U.S. Appl. No. 11/584,087 (sixteen pages), mailed Aug. 31, 2009.
Non-Final Office Action for U.S. Appl. No. 11/584,097 (six pages), mailed Sep. 1, 2009.
Response to Restriction Requirement for U.S. Appl. No. 11/584,097 (twelve pages), dated Oct. 1, 2009.
Response to Restriction Requirement for U.S. Appl. No. 11/584,097 (three pages), dated Oct. 22, 2009.
Non-Final Office Action for U.S. Appl. No. 11/584,097 (five pages), mailed Dec. 23, 2009.
Non-Final Office Action for U.S. Appl. No. 11/584,084 (six pages), mailed Jan. 13, 2010.
Response to Restriction Requirement for U.S. Appl. No. 11/584,084 (two pages), dated Feb. 5, 2010.
Response to Restriction Requirement for U.S. Appl. No. 11/584,097 (three pages), dated Feb. 11, 2010.
Non-Final Office Action for U.S. Appl. No. 11/584,087 (sixteen pages), mailed Feb. 19, 2010.
Spofford, John R., et al., "*Description of the UGV / Demo II System,*" Proceedings: Association for Unmanned Vehicle Systems International Conference, 1997, pp. 255-264 (12 pages).
*Astronomical Data Analysis Software & Systems XIV*, Pasadena, CA, Oct. 24-27, 2004 (194 pages).
Beard, A, et al., "*The Use of CANbus in CARMA*," Astronomical Data Analysis Software & Systems XIV, Pasadena, CA, Oct. 24-27, 2004, p. 153 (1 page).
Rankin, Arturo L., et al. "*Passive perception system for day/night autonomous off-road navigation,*" Proceedings of the SPIE Defense and Security Symposium: Unmanned Ground Vehicle Technology VI Conference, Mar. 2005 (16 pages).
Wikipedia, "*Internet Protocol Suite,*" http://en.wikipedia.org/wiki/Internet_Protocol_Suite, (accessed Apr. 13, 2010) (5 pages).
Amendment and Response to Non-Final Office Action for U.S. Appl. No. 11/584,084, filed Oct. 5, 2010 (58 pages).
Response Under 37 CFR § 1.116 for U.S. Appl. No. 11/584,084, mailed Feb. 23, 2011 (43 pages).
Australian Application No. 2006306522, Office Action mailed on Mar. 17, 2011 (2 Pages).
Non-Final Office Action for U.S. Appl. No. 11/584,084, mailed Mar. 22, 2011 (51 pages).
Response to Final Office Action for U.S. Appl. No. 11/584,097, filed May 5, 2011 (8 pages).
Notice of Allowance for U.S. Appl. No. 11/584,097, mailed May 19, 2011 (7 pages).
Notice of Allowance for U.S. Appl. No. 11/584,087, mailed Sep. 2, 2010, (6 pages).
Amendment and Response to Non-Final Office Action for U.S. Appl. No. 11/584,097, filed Oct. 25, 2010 (13 pages).
U.S. Appl. No. 11/584,084 Office Action mailed on Jan. 4, 2011, 34 Pages.
U.S. Appl. No. 11/584,097, Office Action mailed on Jan. 5, 2011, 5 Pages.
U.S. Appl. No. 11/584,084, Amendment and Response to Non-Final Office Action filed Jul. 22, 2011 (54 pages).
U.S. Appl. No. 11/584,084, Non-Final Office Action mailed Oct. 20, 2011 (31 pages).
U.S. Appl. No. 11/584,084, Amendment and Response to Non-Final Office Action filed Feb. 21, 2012 (42 pages).
U.S. Appl. No. 12/959,429, Restriction Requirement mailed Feb. 10, 2012 (9 pages).
U.S. Appl. No. 12/959,429, Response to Restriction Requirement filed Mar. 12, 2012 (10 pages).
U.S. Appl. No. 12/959,429, Non-Final Office Action mailed Apr. 26, 2012 (16 pages).
Australian Patent Application No. 2011239326, Patent Examination Report No. 1 mailed Jun. 29, 2012 (3 pages).
U.S. Appl. No. 11/584,084, Non-Final Office Action mailed Jul. 13, 2012 (27 pages).
U.S. Appl. No. 12/959,429, Response to Non-Final Office Action filed Jul. 24, 2012 (21 pages).
U.S. Appl. No. 12/959,429, Final Office Action mailed Oct. 1, 2012 (17 pages).
U.S. Appl. No. 11/584,084, Response to Non-Final Office Action filed Nov. 13, 2012 (38 pages).
U.S. Appl. No. 12/959,429, Amendment with Request for Continued Examination filed Jan. 2, 2013 (13 pages).

\* cited by examiner

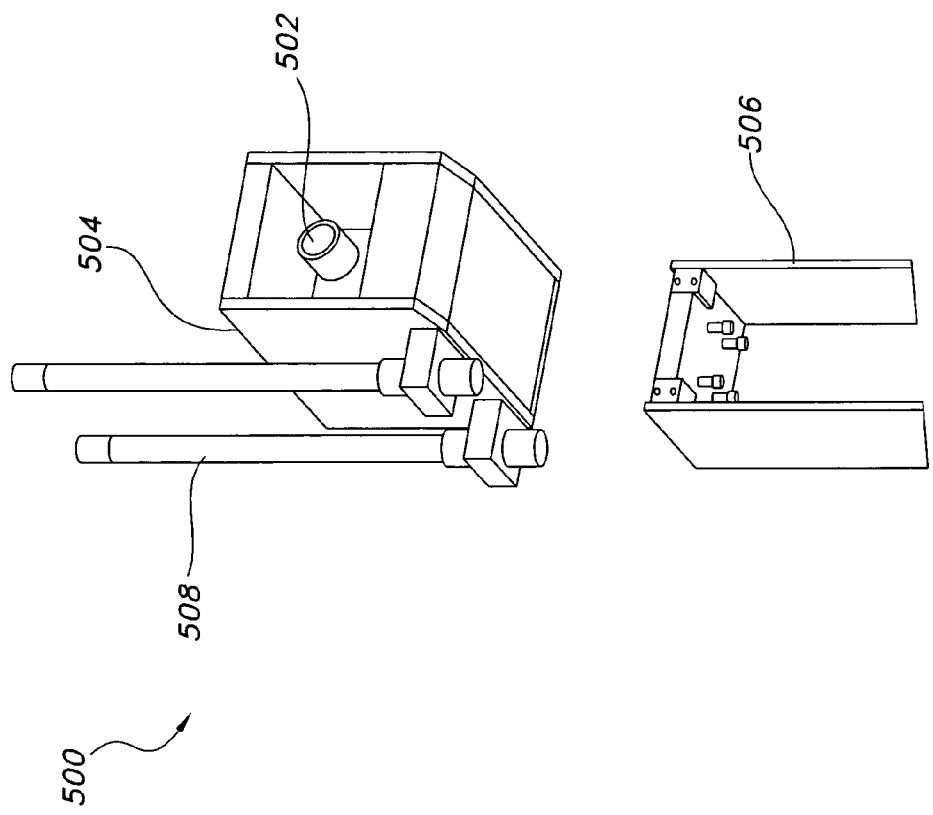

NETWORKED MULTI-ROLE ROBOTIC VEHICLE

RELATED PATENTS AND APPLICATIONS

This application claims the benefit of U.S. Provisional Patent Application No. 60/729,445, filed Oct. 21, 2005, U.S. Provisional Patent Application No. 60/729,388, filed Oct. 21, 2005, U.S. Provisional Patent Application No. 60/780,389, filed Mar. 8, 2006, and U.S. Provisional Patent Application No. 60/838,704, filed Aug. 18, 2006, each of which is incorporated herein by reference in its entirety.

This application is related to U.S. patent applications entitled "Versatile Robotic Control Module" [U.S. Ser. No. 11/584,084]; "Systems and Methods for Obstacle Avoidance" [U.S. Ser. No. 11/584,097]; and "Systems and Methods for Switching Between Autonomous and Manual Operation of a Vehicle" [U.S. Ser. No. 11/584,087], each of which is filed herewith and incorporated herein by reference in its entirety.

This invention also relates to U.S. Pat. No. 6,535,793 entitled "Method and System for Remote Control of Mobile Robot," U.S. Pat. No. 6,813,557 entitled "Method and System for Controlling a Vehicle Having Multiple Control Modes," and U.S. Pat. No. 6,845,297 entitled "Method and System for Remote Control of Mobile Robot," each of which is incorporated herein by reference in its entirety.

This invention also relates to U.S. Pat. No. 6,434,462 entitled "GPS control of a tractor-towed implement," U.S. Pat. No. 6,901,319 entitled "System and method for controlling a ground vehicle," U.S. Pat. No. 6,694,260 entitled "Inertial augmentation for GPS navigation on ground vehicles," U.S. Pat. No. 6,789,014 entitled "Direct modification of DGPS information with inertial measurement data," and U.S. Pat. No. 6,813,557 entitled "Method and system for controlling a vehicle having multiple control modes," each of which is incorporated herein by reference in its entirety.

FIELD OF THE INVENTION

This invention relates generally to systems and methods for autonomous control of vehicles and vehicular sensors, actuators, and/or communications. More particularly, embodiments of this invention relate to systems and methods for modular interfaces, communications protocols, camera mast units, and control units for selected functions.

BACKGROUND OF THE INVENTION

In October 2005, five autonomous vehicles (of twenty-three finalist vehicles) successfully completed the "Grand Challenge" of the United States Defense Advanced Research Projects Administration (DARPA), a competition requiring robotic vehicles to traverse a course covering more than one hundred miles. These vehicles were outfitted with robotic control systems in which a bank of computers controlled all of the operational systems of the vehicle, such as the steering, braking, transmission, and throttle, subject to autonomous decisions made by programs on board the vehicle in response to sensor input, without human intervention on the course itself.

SUMMARY

Certain aspects and embodiments of the present invention provide a networked vehicle that may be controlled in either autonomous or manual mode. In one embodiment, the vehicle has a plurality of payload bays with payload interfaces where payloads may be detachably connected to the vehicle and communicate with the vehicle's control system. The interface may allow integration-free connection for the payloads to a vehicle's control system, including for example a robotic control unit (RCU) and/or a vehicle control unit (VCU) on the autonomous vehicle by providing a power connection and a network port for compatible communication between the payload and the vehicle's control system over one or more networks. For example, there may be a local packet network and a vehicle control network, or any combination of the two.

In certain embodiments, the payload may be a camera mast unit that can detachably connect to a vehicle interface in a payload bay. The camera mast unit may comprise a network interface that can communicate with the vehicle control system over at least one network and a chamber for receiving an ancillary device. The chamber may include a camera mast unit interface to allow the ancillary devices to detachably connect to the camera mast unit and to compatibly communicate with the camera mast unit. In other embodiments the payload may comprise at least one of a GPS system, a chemical detection system, a laser scanner, or a radio.

The vehicle may be provided with payload bays that include one or more payload interfaces. The payload interfaces provide users with the ability to interchange vehicle payloads. The payload interface may also include network ports to allow the payloads to communicate with the vehicle control system by sending and receiving data through the payload interface and network. In certain embodiments, the payload bays are located in the vehicle bed or truck bed. Alternatively, the payload bays may be located under the seats or in the glove box. In one embodiment, the payload bays are located in the truck bed because the payloads are bulky, and would interfere with passenger seating if placed within the seating area or in the glove box.

In some embodiments, the payload bays may include a power connection to provide access to the vehicle's power system. The payload bay may also include a switch for controlling the voltage and current levels of the power. In one embodiment, the power supply and switch is controllable with or by each RCU. Providing flexible power allows each payload to provided with its own preferred voltage and current, without adding additional power supplies.

Certain embodiments may simultaneously use two operator control units (OCU) that may control payloads and/or the vehicle control system. A first operator control unit, called a dashboard OCU, is sufficiently small to be detachably secured to the dashboard of the vehicle. The second operator control unit, called a remote OCU, may be used by a person that is not traveling in the vehicle. It can be used to control the vehicle and systems or payloads on the vehicle when the vehicle is functioning in autonomous, or teleoperational mode. It includes a display that has sufficient resolution to show a replica of the dashboard OCU screen, including a substantially real-time replica of the data and graphics displayed on the dashboard OCU. The operator of the remote OCU may send data for display upon the screen of the dashboard OCU.

Both operator control units, dashboard and remote, can communicate with the vehicle control system to control functions of the autonomous vehicle. The operator control units may receive data in Ethernet packets from the vehicle's control system or payloads, and may display the data. The operator control units may also send commands to, and control functions of, the vehicle control system. For example, the dashboard OCU may allow an operator to control local functions of the vehicle control system, such as for example steering or controlling functions of the payload.

In some embodiments, various combinations of robotic control units (RCU) and/or a vehicle control units (VCU) handle the computation of data and functions. In one embodiment, robotics computation is handled by processing circuits within the RCUs, which also each contain a power supply, a motor amplifier, a motor driver (DSP), an Ethernet switch. In some embodiments, it is not necessary that robotics computation be handled by RCUs—one central computer, or a less distributed solution may be used.

In certain embodiments, the RCU and/or VCU use a virtual terminal protocol to encapsulate Controller Area Network (CAN) or other types of data into one or more Ethernet packets. The RCU and/or VCU may then send the Ethernet packets to a dashboard OCU, remote OCU, or payload over at least one network. For example, there may be a local packet network such as an Ethernet network, and a vehicle control network such as a CAN network, or any combination of the two. The Ethernet network is useful for transferring data among the payload, actuators, sensors, and control, but is not usually the same physical layer that would be used for teleoperation of the vehicle. At the same time, it is useful for teleoperation of the vehicle if the Ethernet and CAN networks rely upon the same network protocols. Accordingly, the local packet network preferably has a first physical and/or data link layer and connects to a remote OCU with a second physical and/or data link layer, but each layer uses the same transport layer. For further flexibility, the packets of the vehicle control network may be tunneled through the transport layer, either among the payload bay, processor circuits, sensors, and or actuators on the vehicle, or to the remote OCU via radio. It is advantageous that the local packet network have connector(s) in the passenger compartment and in the truck bed so that payloads or systems may be plugged into the vehicle to communicate over the networks.

In one embodiment a teleoperation radio is connected to the Ethernet network, which provides a channel for the remote OCU to plug a control or other accessory into the remote OCU. In this manner, controls or other accessories for a particular payload system may be used alternately in either the passenger compartment or at the remote OCU.

BRIEF DESCRIPTION OF THE DRAWINGS

These and other features, aspects, and advantages of the this invention are better understood when the following Detailed Description is read with reference to the accompanying drawings, wherein:

FIGS. 5A-C show a camera and a camera mast unit according to one embodiment of the present invention.

DETAILED DESCRIPTION

General Overview

Figure 1:
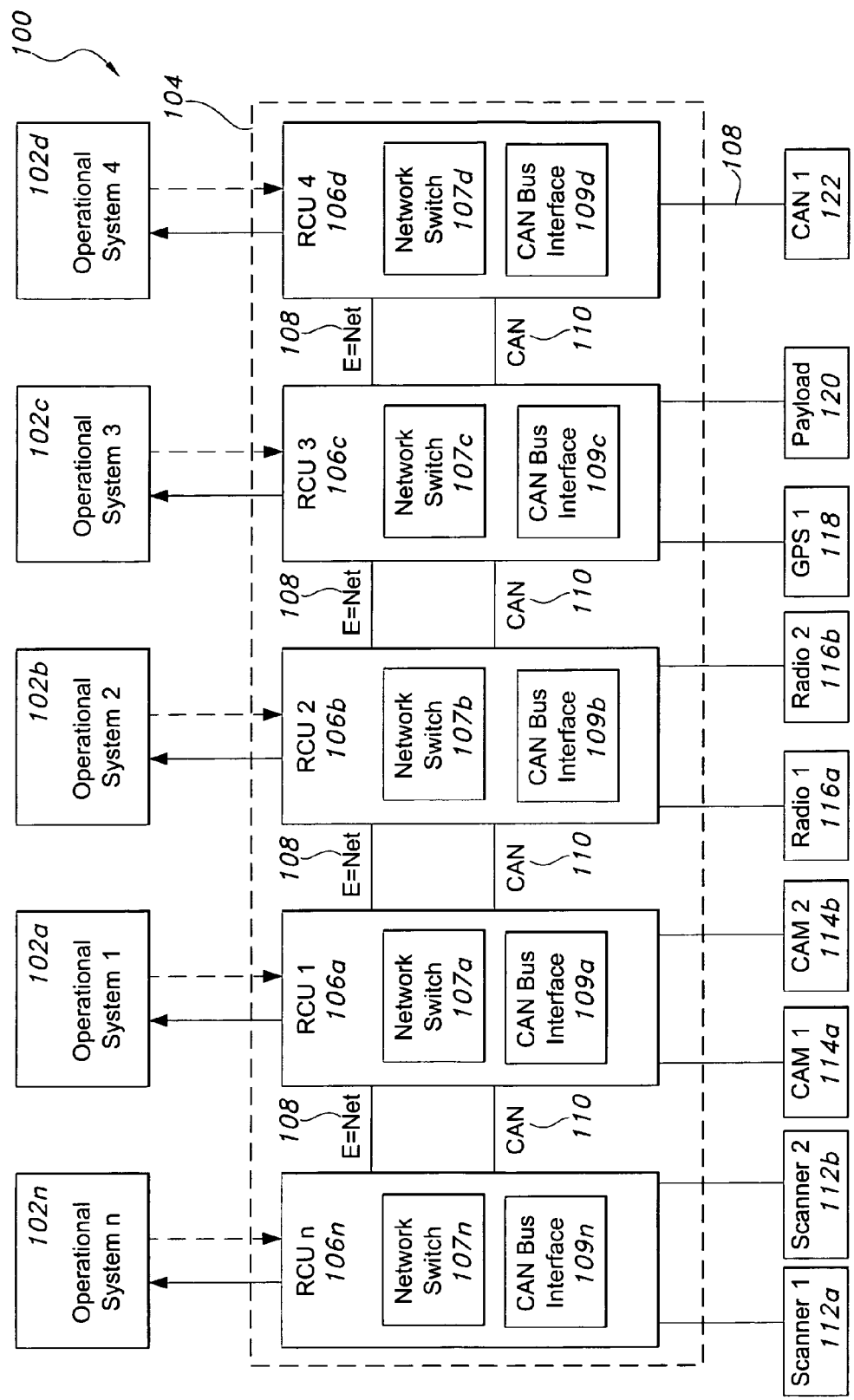
FIG. 1 is a block diagram of a vehicle control system in one embodiment of the present invention.

Autonomous, unmanned, or robotically controlled vehicles may need additional payloads, such as structures, sensors, or control systems, integrated with the vehicle to perform specific tasks. For example, the autonomous vehicle may need a chemical detection system for one task and an x-ray sensor for a second task. To use these additional systems the autonomous vehicle may need retrofitting, or otherwise require a large amount of configuring to integrate these payloads. Accordingly, a need exists for an autonomous vehicle having a modular interface for payloads that allows integration of the payloads with relative ease. In some embodiments, the autonomous vehicle may be operated in a teleoperation or other modes, as controlled by a remote OCU or dashboard OCU.

Autonomous vehicles may also include a camera mast unit communicating with the vehicle's control system for detecting images and transmitting data to the control system. For some autonomous vehicle tasks, the camera mast unit may need to include additional components to provide the camera unit with greater functionality. In addition, some tasks may require a different camera mast unit than the unit connected to the vehicle or a different type of device. Accordingly, a need exists for a camera mast unit that includes a structure for receiving additional camera components, and a camera mast unit interface to allow the camera unit to easily connect and disconnect with the autonomous vehicle and communicate with the vehicle's control system.

A remote control device may control some autonomous vehicles by sending commands to and receiving data from the vehicle's control system. Often, remote control devices are located in a central location and do not travel with the vehicle. Remote control devices may contain a large number of functions and have the ability to receive and send large amounts of data. The remote OCU may receive data from the autonomous vehicle related to the position, orientation, obstacles, or other similar data and transmit movement commands or payload commands accordingly. For example, in certain embodiments cameras located on the vehicle transmit full-motion video to the remote OCU. The remote OCU transmits and receives information using a low-altitude retransmitter or reflector. Control latency prevents most long-distance implementations of the full-motion video, such as for example satellite operation. In some instances, an individual relatively close to the autonomous vehicle without a remote OCU available may need to control the vehicle's local functions, such as directing the vehicle to follow the path it just traveled. Accordingly, a need exists for a system that can communicate and control, at least, the local functions of the autonomous vehicle and be located relatively close to or on the autonomous vehicle.

If a vehicle control system includes more than one network, the components that normally transmit data in a first network may be unable to communicate using a second network. Accordingly, a need also exists for a communications protocol that allows communication between control system components, even if the components transmit data on a network different than the type of data transmitted.

Embodiments of the present invention provide a networked multi-role robotic vehicle. An embodiment may include systems or methods for autonomous vehicle payload interface, camera mast configurations, communication protocols for a vehicle control system, or a dashboard OCU for local vehicle function control.

Various aspects and embodiments of the present invention provide a vehicle that can operate in manual or autonomous modes. The vehicle may comprise one or more payload bay areas and a vehicle control system. In some embodiments of the present invention, the vehicle control system can utilize one or more networks to receive data from sensors and send controls to vehicle actuator components to control vehicle movements and modes. For example, vehicle control at the actuator level may include control of basic vehicle functions such as velocity, steering, body lighting, dash switch interfaces, and diagnostics. Control devices may communicate with the vehicle control system components and remote and/or local control units over the one or more networks using control commands. The payload bay areas may be located in the vehicle's trunk or truck bed. The payload bays can include payload interfaces that allow payloads, such as particular functional components, to detachably connect to the payload interface and provide compatible communication with the vehicle's control system. Embodiments of the invention may provide an interface that allows the payloads to be interchanged with relative ease. In some embodiments of the present invention, the vehicle control system network includes a short-range physical layer and/or protocol, such as TCP/IP, Ethernet, local mesh, wireless USB, and/or ZigBee. Embodiments may also include a long-range physical layer or protocol between the vehicle control system components and a remote or operator control unit, such as Wi-Fi or wireless local area network, such as IEEE 802.11, 900 MHz military protocols, satellite, and/or line of sight laser networks.

The vehicle may also include a detachably connected camera mast unit that can support a camera to receive and process images. The camera mast unit may connect to a vehicle system network through a mast interface that provides for compatible communication between the camera and the vehicle's control system. The mast interface may allow for additional components to be interchanged with relative ease. In some embodiments, the camera mast unit is connected to the vehicle at a payload interface between the vehicle bed and operator/passenger area.

In some embodiments of the present invention, the vehicle's control system may communicate with a remote OCU that can be a remote control device for sending control signals to the vehicle's control system and receiving data from the control system. The vehicle may also include a dashboard OCU that can detachably connect to the vehicle and communicate either wirelessly or through a wireline with the vehicle's control system. An operator may use the dashboard OCU to control at least some vehicle functions. For example, an operator may, while operating the vehicle in manual mode, use the dashboard OCU to command the vehicle control system to record GPS waypoints during the vehicle travel. When the operator reaches his or her destination, the operator can use the dashboard OCU to command the vehicle to operate in autonomous mode to return to its starting position by following the recorded waypoints from last waypoint to first.

In some embodiments of the present invention, the vehicle control system communicates with the dashboard OCU and/or payloads interfaced with the vehicle using a virtual terminal protocol that can encapsulate CAN or other types of formats of data into Ethernet packets and transmit the Ethernet packets over an Ethernet network to the dashboard OCU and/or payloads. The dashboard OCU and/or payloads may receive the Ethernet packets and extract and display the CAN or other type of data. An example of one embodiment of the virtual terminal protocol is the SAE J1939 and ISO 11783-6 standards.

The vehicle may operate in one or more different types of modes. For example, the vehicle may operate in a "Follow Me" mode, a teleoperation mode, a teaching playback mode, or a GPS waypoint mode and utilize various aspects of the present invention to control and monitor these modes. In some embodiments of the present invention, an operator may use a dashboard OCU and/or a remote OCU simultaneously or separately to control the vehicle's mode of operation and other controls.

For example, an operator may use a remote OCU to receive data such as camera, sensor, and position data from the vehicle. The remote OCU may display the data in a variety of formats suitable for an operator and/or the remote OCU to analyze the data. The operator can then input commands into the remote OCU, such as by entering a command on a keyboard, mouse, touch screen or other input component. For example, the remote OCU operator may input a command for the vehicle to operate in a GPS waypoint mode. The remote OCU can transmit the command on a network that may be wireless to the vehicle control system. The vehicle control system receives the command and controls the vehicle functions in accordance with the command by, for example, sending control data to the vehicle's robotic actuators, sensors and payloads. The vehicle control system may also send data, wirelessly or over a wireline network, to a dashboard OCU. The dashboard OCU can display, at least, selected portions of the data to a user that may be in the vehicle's operator or passenger compartment or otherwise relatively close to the vehicle. The user can analyze the vehicle's mode of operation and other data displayed on the dashboard OCU and input, at least local, commands to the dashboard OCU. For example, the user may input a command to operate in a teaching playback mode when the vehicle reaches a certain location. The dashboard OCU can transmit the command to the vehicle control system over the network and the vehicle control system may send commands to the vehicle's components in accordance with the command. The following is a description the modes mentioned above.

Follow Me Mode:

Under the "Follow Me" mode, one or more objects are identified by a sensor or camera unit and the robotically controlled vehicle is controlled to follow the object. An operator may implement the "Follow Me" mode by selecting the mode and/or the object to follow via the remote OCU or dashboard OCU. In the "Follow Me" mode, vehicle components determine whether an object is identified as one to follow. If there is no pre-determined object to follow, the system may detect and select the closest object within the detection zone, which may be defined by the area with which a laser beam has the ability to detect object and/or identify objects. The "Follow Me" mode algorithm may use a library of commands to create a trajectory towards the objector and may include speed and direction components that do not allow the vehicle to exceed a pre-selected maximum allowed speed and include a command to stop at a pre-selected distance away from the object. After the object is initially selected by the vehicle control system, remote OCU, and/or dashboard OCU or the vehicle is already following the object, the vehicle's position may be estimated relative to its previous position and the object's movement. Additionally, the object's estimated or expected position is also calculated. If no moving object is detected within the estimated position range within a pre-determined amount of time, the vehicle will no longer search for the moving object and will attempt to locate another moving object to follow using the process described above.

After detecting the moving object, a trajectory set is calculated to provide the vehicle with movement commands. The trajectory may be spread into a trajectory set by calculating vectors separated by a pre-determined angle, for example by 5 degrees, to the right and left of the moving object trajectory. Additional trajectories may be included between the vectors to provide additional trajectories of a trajectory set. Each trajectory may be assigned a preference. For example, the trajectory located in the middle of the trajectory set may be assigned a value associated with the most preferred while the vectors furthest from the middle vector have a preference value associated with the least preferred vector. The trajectory set is then provided to the drive arbiter component as an action set. An obstacle map may be calculated, based on information obtained from sensors, such as the front and rear laser beams, including the presence and location of obstacles. The obstacle map may be provided to a drive arbiter component as a limit on the trajectory sets.

GPS Waypoint Mode:

In some embodiments of the present invention, the vehicle is directed based on GPS waypoint information using a GPS determination system. Examples of a GPS determination system include Navcom SF-2050M. An operator may implement the GPS waypoint mode by selecting the mode, beginning, and/or end waypoints via the remote OCU or dashboard OCU. For example, GPS waypoint information is continually updated from a waypoint list and trajectory sets are developed based on the next waypoint relative to the current and/or last waypoint. First, a current waypoint correlating to the position at which a vehicle is supposed to be located is calculated by the vehicle control system and/or the remote OCU. A heading controller library provides a trajectory towards the current waypoint with velocity and direction information that will prevent the vehicle from exceeding a pre-determined speed to reach the current position. The vehicle's position is then calculated to determine whether the vehicle is within a waypoint radius or whether the vehicle has traveled past a perpendicular plane associated with the current waypoint. A "next" waypoint is then determined and a trajectory is calculated based on the current and next waypoint. Based on the trajectory information, a trajectory set is created by calculating vectors with a predetermined distance between them, for example 5 degrees, with the moving object trajectory being assigned the trajectory in the middle of the set. Additional trajectories may be included between the created trajectories and each trajectory assigned a preference value, with less preferred values being assigned to trajectories further from the middle trajectory.

Furthermore, a user may record a pre-determined GPS path and provide the information to an RCU, upon a command from the remote OCU or dashboard OCU, by saving the information to an RCU's flash memory. The user may then initiate a GPS path playback system by utilizing a dashboard OCU. The user may record the GPS information by initially recording GPS latitude and longitude readings where the GPS information is compressed by removing outlying GPS data points. A waypoint list manager may queue all waypoints that are selected to be followed. In some embodiments of the present invention, path segments between the waypoints may be determined and utilized to create a curved path for the vehicle to follow. Alternatively, a tech center path tracker is utilized to create a path that provides for consistent or smooth vehicle movements. The trajectory set is then provided to the drive arbiter, which will determine the appropriate trajectory based on the trajectory set and information related to the presence and/or location of obstacles. In some alterative embodiments, trajectory sets are created based on data obtained from a compass, instead of a GPS system, and relative locations of objects, destination points, and/or previous position data. Examples of compass systems utilized include electronic compass TCM 2-20.

Teleoperation Mode:

In some embodiments of the present invention, the vehicle's path is developed by teleoperation. A receiver connected to the vehicle is adapted to receive commands from the remote OCU and/or dashboard OCU. For example, the teleoperation component may open a socket, such as by creating a communications end-point and returning a file description with which to access a socket that is associated with a socket address, including a port number a local host's network address. Commands are transmitted from a user control interface on an OCU, for example, based on information transmitted to the user control interface that is, or is associated with, data captured by a camera located on the vehicle through a radio communications link or network. Examples of such radio networks include the utilization of 2.4 GHz radio system such as is manufactured by Rubicon Communications, doing business as Netgate, of Kailau Hi. or a 900 MHz radio system such as the EH900™ model manufactured by Nova Engineering, Inc. of Cincinnati, Ohio. The EH900™ model radio system may be combined with a 802.22b radio system such as manufactured by Netgate to provide superior communication over relatively short and long distances. Examples of camera systems include a 10/100 Base T Fast Internet connection and a SNC-CS3N™ model camera as manufactured by Sony Electronics, Inc. of Park Ridge, N.J.

The teleoperation system can receive a command that includes either zero or non-zero velocity information. If the velocity command is zero, a command history is consulted to determine whether a pre-determined number of past commands have also contained a zero velocity command. If there has been a pre-determined number of past commands, a trajectory set based on any directional information associated with the current command is not created. If the velocity command is non-zero or one or more of the previous commands have included non-zero velocity commands, a trajectory set is created. A trajectory set is created by calculating vectors with a predetermined distance between them, for example 5 degrees, with the moving object trajectory being assigned the trajectory in the middle of the set. Additional trajectories may be included between the created trajectories and each trajectory assigned a preference value, with less preferred values being assigned to trajectories further from the middle trajectory. The trajectory set is then provided to the drive arbiter, which will determine the appropriate trajectory based on the trajectory set and information related to the presence and/or location of obstacles.

Teach and Playback Mode:

In some embodiments of the present invention, the vehicle may be operated in a teach and playback mode. A user interface may be provided such as a dashboard OCU attached to the vehicle or incorporated in a teleoperation system (or some other suitable user interface). The teach and playback system may provide the vehicle with an instruction to record movements, drive signals and other path related information, such as GPS waypoints, location of obstacles, etc., and follow the recorded information when following a path back to the origination. For example, the vehicle will store velocity and direction information and correlate the information to particular GPS data and/or time stamp information. Upon a return trip, the system recalls the data to provide the vehicle with velocity, directional, or any other related information to follow a return path. The vehicle may be capable of following the playback movement information and data in either the forward or reverse. In addition, the data recording may be repeated for additional path trips.

Illustrative Control System and Interfaces

FIG. 1 is a high-level block diagram on a vehicle control system 100 of one embodiment of the present invention. The vehicle control system 100 includes a robotic control system 104, which in the embodiment shown includes the versatile robotic control units (RCUs), 106a-n. The RCUs 106a-n may be connected and may communicate with each other and other control system and vehicle components via a CAN bus 110 and a packet switched network 108, such as an Ethernet network. In some embodiments, only a packet switched network 108 may be used. Some embodiments of the RCUs 106a-n may include a network switch 107a-n for allowing communication with other control system and vehicle components on a network. In one embodiment, the network may be an Ethernet network. The RCUs 106a-n according to some embodiments may include, separately or in addition, a CAN bus interface 109a-n that can communicate with a CAN network and control system and vehicle components in the CAN network. If an RCU 106a-n fails to operate properly, other control system and vehicle components may communicate through the network switch 107a-n and/or CAN bus Interface 109a-n.

The vehicle control system 100 shown in FIG. 1 also includes several operational systems, 102a-n. Each operational system, 102a-n may in some embodiments be in communication directly or indirectly with an RCU 106a-n. These operational systems 102a-n can be used to control the movement of the vehicle and can include, for example, the steering system, the braking system, the throttle system, and the steering system. Each operational system may contain an actuator, such as a motor, for example, that can control the operation of the particular operational system. For example, the braking system can contain an actuator that controls the application of the brake for the vehicle. The RCUs 106a-n can further be connected or otherwise receive inputs from and provide signals to scanners 112a-n, such as laser scanners, cameras 114a-b, radios 116a-b, and a Global Positioning System (GPS) 118. In certain embodiments, the RCUs 106a-n are housed within a volume of roughly 5-10 liters, and it is probably not possible to house RCUs having equivalent functionality in a space less than this.

The vehicle control system 100 may also comprise a vehicle control unit (VCU) (not shown). The vehicle control unit receives inputs and utilizes the input to determine how to control one or more of the operational systems 102a-n. For example, the vehicle control unit may receive an input from an RCU 106a-n that indicates that the vehicle should be turned to the right. In response to this signal, the vehicle control unit may output a control signal to the steering system to cause the actuator to turn the steering shaft.

Both the vehicle control unit and RCUs 106a-n may each comprise a processor. The processor comprises a computer-readable medium, such as a random access memory (RAM) coupled to the processor. The processor executes computer-executable program instructions stored in memory, such as vehicular or robotic control algorithms. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor with computer-readable instructions (such as executable code). Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise executable code from any suitable computer-programming language, including, for example, C, C++, C#, Visual Basic, Java, Python, Perl, and JavaScript.

The RCUs 106a-n in FIG. 1 may also be connected to other suitable payloads 120 through a payload interface (not shown). The payload interface may be securely mounted within the side or bottom walls of a vehicle bed such as a truck bed. The payload interface may allow payloads 120 to connect to RCUs 106a-n located in a vehicle body over one or more networks. The payload interface may include an Ethernet port, a CAN port, an RS232 port, or other suitable network communication port. Connectors in the truck bed or mast(s) may be armored versions of Ethernet or other multipin connectors, or WPAN transceivers. Embodiments of the present invention including the payload interface provide a user with the ability to "plug and play" payloads 120 and interchange payloads 120, as required for a particular vehicular task. The payload interface may also include other network ports to allow a plurality of payloads 120 having different port requirements to communicate with the vehicle's RCUs 106a-n over a network. For example, an operator can interchange payloads 120 with payload interfaces, as required by a particular vehicle task, without reconfiguring the autonomous vehicle's wiring or other structural components.

Examples of payloads 120 include radar sensors, generators, actuator and motor controllers, and thermal cameras.

In some embodiments of the present invention, the payload interface may also or separately include a power source connection, and may further include a switch for controlling the voltage and current levels of the power. Providing flexible power allows each payload to provided with its own preferred voltage and current, without adding additional power supplies. The power source connection may be plugs, connectors, adapters, couplers, fasteners, or otherwise any type of interface that can allow the payloads 120 to be attached and detached from the interface with relative ease. Switchable DC power settable at different voltage/current levels may be provided near to each Ethernet port, via another connector, connecting leads, or a wire harness split-off proximate the Ethernet network port. In such a case, the voltage level is best set at the location of the power supply, and multi-voltage switchable power supplies may be distributed along the Ethernet network to provide local power. The power supplies may be controllable by a circuit connecting each power supply to the vehicle Ethernet network, or to the CAN network. In one embodiment, one such power supply and connecting lead is provided to and controllable with/by each RCU as discussed herein.

Payload interfaces according to some embodiments of the invention may be located in a payload bay, such as the vehicle's trunk or truck bed, to provide an area where payloads 120 may detachably connect to the vehicle without interfering with an operator's ability to operate the vehicle in manual mode or in areas, included in some vehicles, for passengers. In connecting payloads 120 to the RCUs 106*a-n* through an interface that provides compatible communication, a remote OCU and/or dashboard OCU may be used to control payload operation and receive data from the payloads 120 through the communications network located in the vehicle and, in some instances, the communications network between the vehicle's control system and the control units, such as a wireless network. In some embodiments, a passenger or operator can control payloads 120 by using control devices, such as, for example, a dashboard OCU or a remote OCU while the vehicle is operating in manual or autonomous modes.

The payload interfaces according to some embodiments of the present invention may be connected to a switch or router that may be included in the RCUs 106*a-n* or otherwise in the vehicle control system. In other embodiments, the payload interface can include a switch or router. The switch or routers can send and receive signals to and from payloads 120 connected to the payload interface to the appropriate or desired vehicle control system component or control device in accordance with the particular requirements of the payload 120.

Figure 6B:
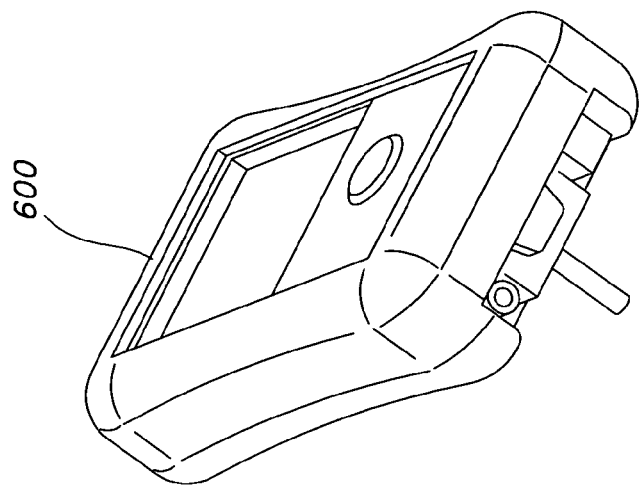
FIGS. 6A-B show a dashboard operator control unit and interface according to one embodiment of the present invention.
Figure 6A:
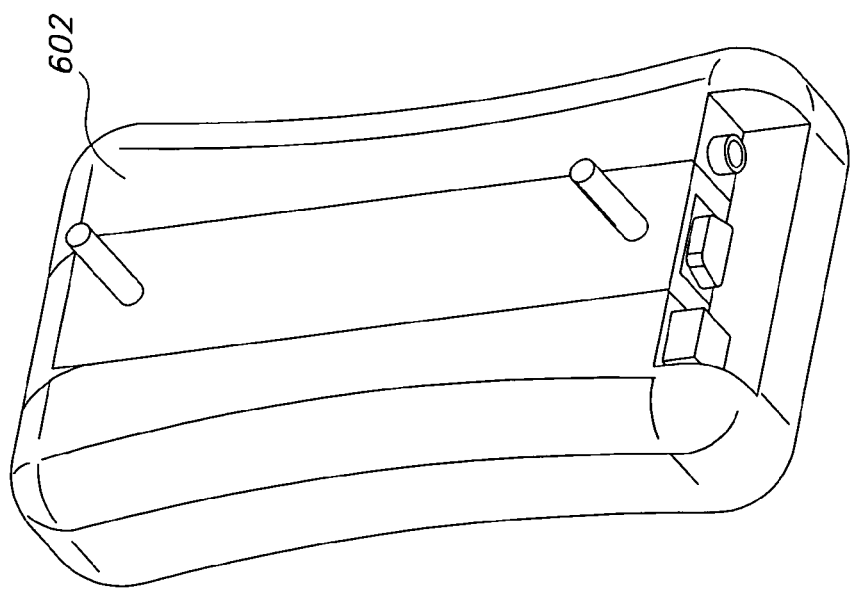
Figure 7:
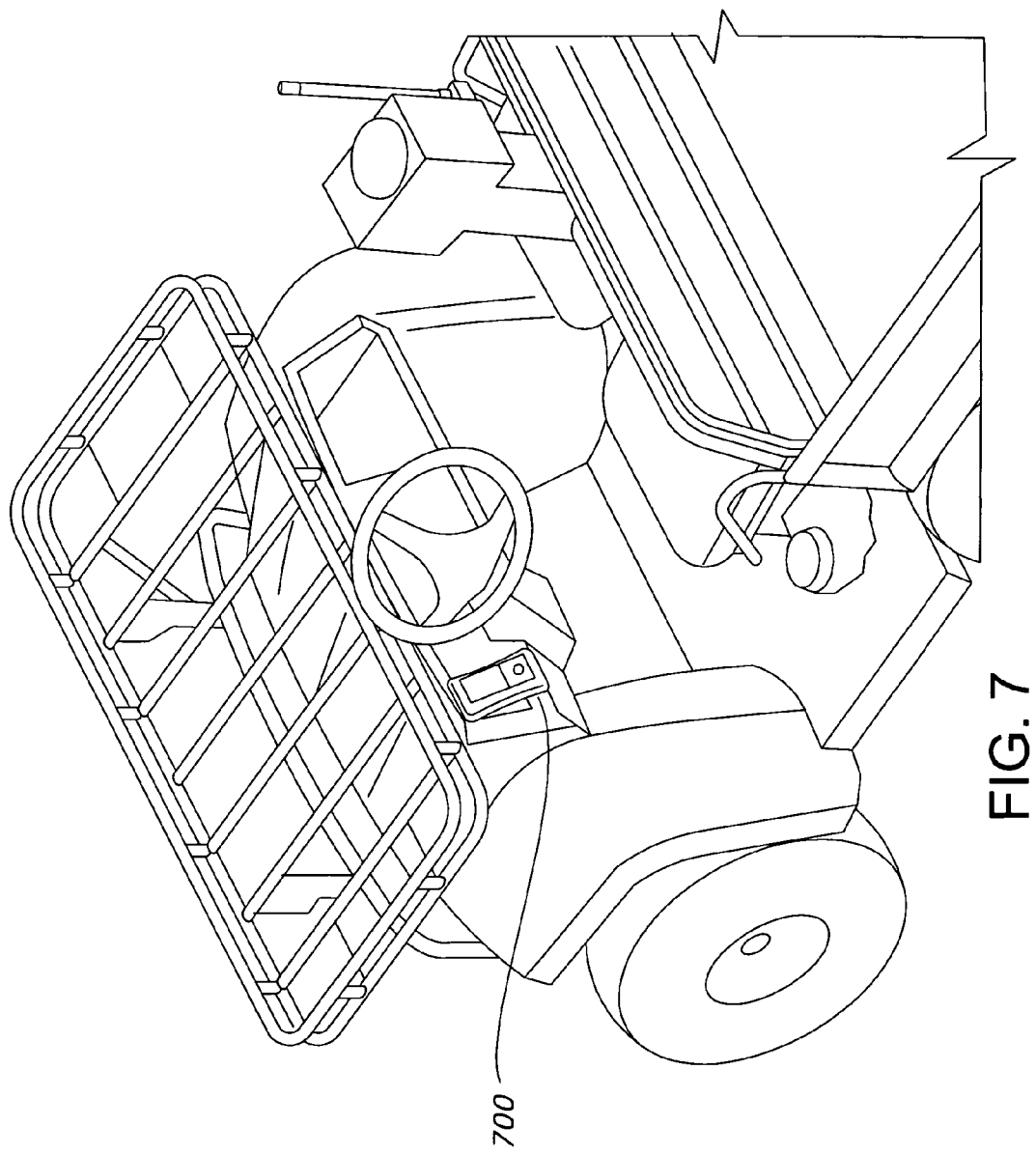
FIG. 7 shows a dashboard operator control unit attached to a vehicle according to one embodiment of the present invention.

The RCUs 106*a-n* may also be connected to one or more CAN devices 122. A CAN device 122 can control the vehicle's local functions such as headlights, and operational modes described in more detail below. An example of a CAN device 122 may include a dashboard OCU. The dashboard OCU may be a control device that can detachably connect to the vehicle, as illustrated in FIGS. 6 and 7, and communicate with the vehicle's RCUs 106*a-n* through a network, such as an Ethernet. The dashboard OCU may read, display, and send data to and from the RCUs 106*a-n*. In some embodiments, the dashboard OCU may comprise a memory having software that can display received graphic data and transmit input commands from an operator to the RCUs 106*a-n*. Other CAN devices 122 may include scanners 112*a-b*, cameras 114*a-b*, and the GPS 118.

In some embodiments of the present invention, the CAN device 122 interface may be an external CAN bus port to allow an external device, such as a payload, dashboard OCU, or otherwise to communicate with RCUs 106*a-n*. One or more of the RCUs 106*a-n* may be replaced with VCUs that can perform at least some of the functions associated with the RCUs 106*a-n*. The CAN device 122 port may also allow payloads, dashboard OCUs, or other devices to communicate with the VCUs. In some embodiments of the present invention, the CAN device 122 port provides user with access to the vehicle control system and the ability to attach payloads that can send and receive data with the vehicle control system.

FIG. 6 shows one embodiment of a dashboard OCU 600 that is a PDA-like device mechanically and/or electrically connectable to an interface 602. Some examples of acceptable dashboard OCUs 600 are the Recon™ model as manufactured by Tripod Data Systems of Corvallis, Oreg.; a iPAQ™ model as manufactured by Hewlett-Packard of Palo Alto, Calif.; or a Greenstar 2™ model as manufactured by Deere & Company of Moline Ill. Preferably, the dashboard OCU 600 includes a screen smaller than about 500 square centimeters. It is preferably a color matrix display, but for the sake of outdoor visibility may include some segmented elements (fluorescent or LCD) or be formed entirely from them. It preferably includes a touchscreen or stylus-responsive screen for inputting user commands. As shown in FIG. 7, the dashboard OCU 600 is attachable to and detachable from the dashboard 700 to provide a vehicle operator with access to the dashboard OCU 600 for control of, at least, local vehicle functions. The dashboard OCU is connected to the dashboard 700 by one of the Ethernet network ports and/or CAN network and/or local wireless or WPAN. When mounted, the dashboard OCU 600 is visible when driving the vehicle in the driver's seat or as a passenger in that seat, but may also be dismounted. In some embodiments, the operator may detach the dashboard OCU 600 from the interface 602 and communicate with the vehicle's control system wirelessly.

Certain embodiments also provide a remote OCU 250 that may be used by someone that is not traveling in the vehicle to control the vehicle in autonomous mode. It may include a display that has sufficient resolution to show a replica of the dashboard OCU 256 screen, including a substantially real-time replica of the data and graphics displayed on the dashboard OCU 256. The operator of the remote OCU 250 may send data for display upon the screen of the dashboard OCU 256. In operation, the remote OCU 250 may display a copy of the dashboard OCU 256 on its screen. This has a familiarity and training benefit, as the dashboard OCU 256 is reproduced on the screen of the remote OCU 250. The remote OCU 250 display may also reflect button presses or touchscreen/stylus tracks being input to the dashboard OCU 256 in real-time, such that the remote OCU 250 may be used to observe training or operation of the vehicle using the dashboard OCU 250.

Figure 2A:
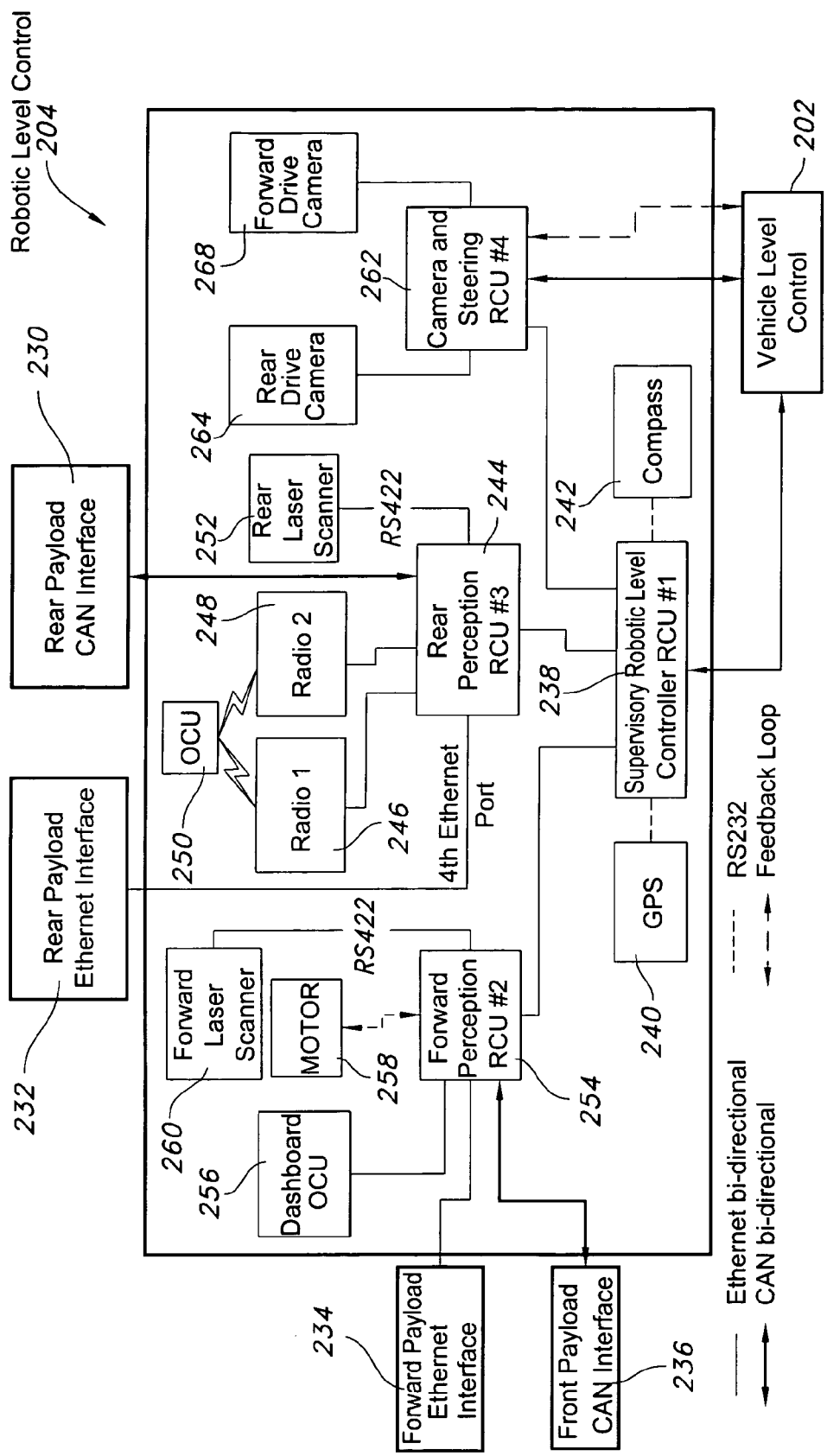
FIGS. 2A and 2B are functional schematic diagrams of an illustrative control system in an embodiment of the present invention.
Figure 2B:
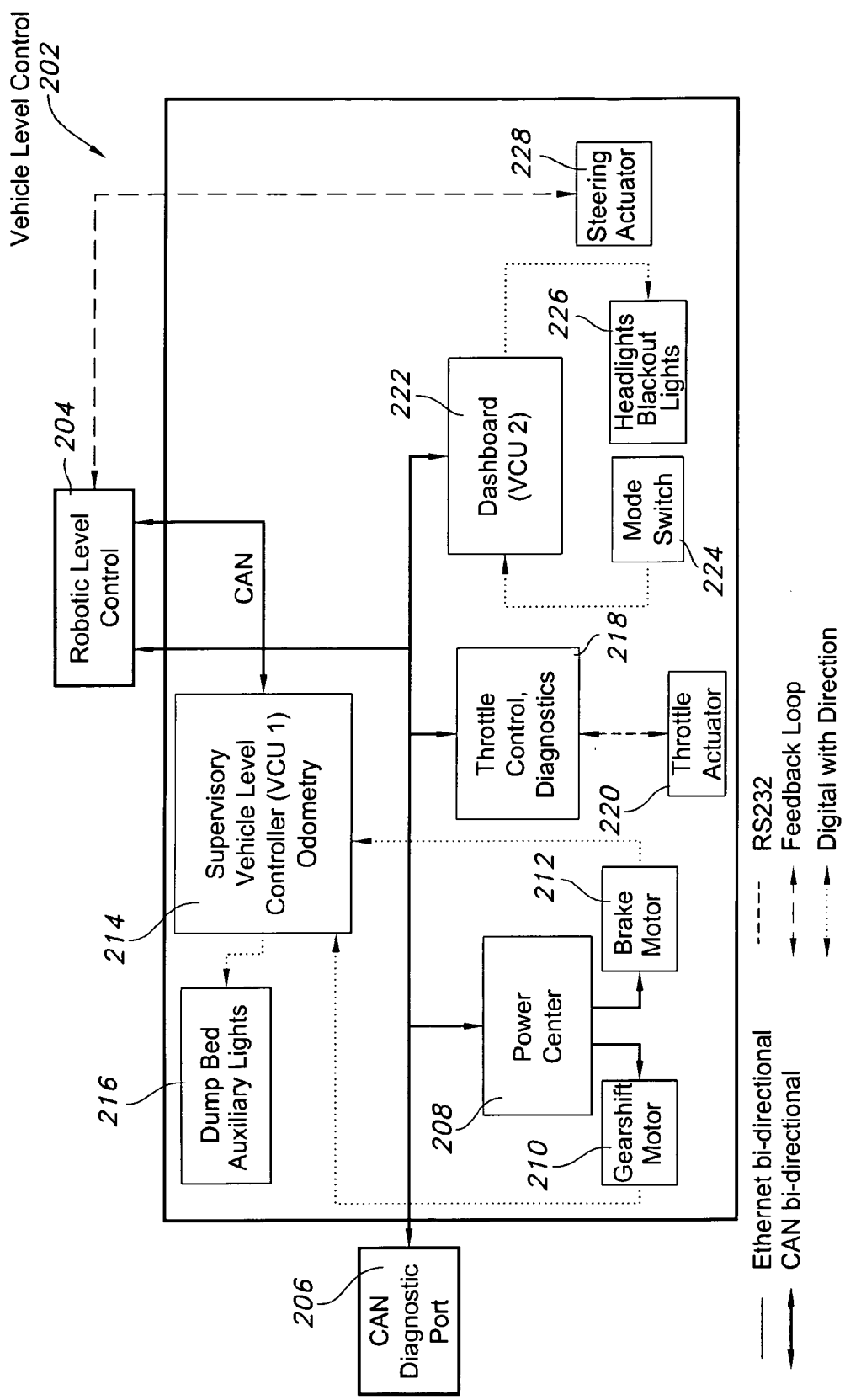

FIGS. 2A and 2B are functional schematic diagrams of an illustrative control system in one embodiment of the present invention. The embodiment shown in FIG. 2B comprises a vehicle level control section 202, and the embodiment shown in FIG. 2A comprises a robotic level control section 204. The two sections 202, 204 operate as a hierarchy. In some embodiments, robotic level control section 204 is on top. In other embodiments, the vehicle level control section 202 is on top. The vehicle level control section 202 maintains the personality of the vehicle for which it is configured.

The vehicle level control 202 comprises one external interface, a CAN diagnostic port 206. In other embodiments, other ports, as illustrated in FIG. 2A or otherwise, may be included. The vehicle level control 202 also comprises an electronic power center 208. The electronic power center 208 provides power to a gearshift motor 210 and a brake motor 212. The gearshift motor 210 and brake motor 212 are the actuators for the transmission and brake systems, respectively.

The vehicle control system 202 also comprises a supervisory level controller (VCU 1) 214. This role could be performed by an additional RCU. The supervisory level controller 214 is in communication with various systems of the vehicle. For example, the supervisory level controller 214 is in communication with the dump bed, auxiliary lights, and enunciator 216. The supervisory level controller 214 is also in communication with the gearshift motor 210 and the brake motor 212.

The vehicle control system 202 also comprises a controller 218 for throttle control and diagnostics. The controller 218 can be an APECS™ model throttle controller provided by Woodward Governor Company, of Rockford Ill. This role could be performed by an additional RCU. The controller 218 is in communication with the throttle actuator 220. The controller 218 provides actuator signals to and receives feedback from the throttle actuator 220.

The vehicle level control section 202 also comprises a dashboard controller 222. The dashboard controller 222 provides control for a mode switch 224 and for headlights and blackout lights 226. The vehicle level control section 202 also comprises the steering actuator 228.

The robotic level control section 204 also comprises external interfaces. The external interfaces of the robotic control section 204 shown in FIG. 2A comprise a rear payload CAN interface 230 and a rear payload Ethernet interface 232. The external interfaces also comprise a front payload CAN interface 236 and forward payload Ethernet interface 234. The payload interfaces 230, 232, 234, 236, however, may be located anywhere on the autonomous vehicle, including a trunk or truck bed. The payload interfaces 230, 232, 234, 236 can include an Ethernet port, a CAN port, an RS232 port, a power source connection, and/or any suitable port used by payloads. The ports or connections may include connectors, plugs, couplers, fasteners, or any structure that can attach to a payload and provide communication between the payload and the vehicle control system. For example, the ports may provide the payloads with access to the RCUs 238, 254, 244, 262, VCUs 214, 222, and/or remote OCU 250. The payloads may send data, such as levels of harmful chemicals that are detected if the payload is a chemical detection system, and receive data or commands such as command to move the direction of chemical detection.

The payload interfaces 230, 232, 234, 236 may be configured to allow the payloads to be connected and disconnected from the interfaces with relative ease and to communicate with the robotic control units as required by the payload. For example, a chemical detection payload may be attached to the rear payload Ethernet interface 232 that allows the payload to send data regarding the presence of particular chemicals to rear perception RCU (#3) 244. For a subsequent task, a sniper detection with offensive capabilities may need to send and receive detection data to rear perception RCU (#3) 244. In some embodiments of the present invention, an operator can detach the chemical detection payload and attach the sniper detection payload to rear payload Ethernet interface 232 without configuring wiring on the autonomous vehicle, and the sniper detection payload can send and receive data from rear perception RCU (#3) 244.

The robotic level control section 204 according to the embodiment shown in FIG. 2A includes four RCUs: a supervisory robotic level controller RCU (#1) 238, a rear perception RCU (#3) 244, a forward perception RCU (#2) 254, and a camera and brake RCU (#4) 262. The RCUs 238, 244, 254, and 262 can be configured identically or can be configured for the specific function. If the RCUs 238, 244, 254 are configured identically, then the RCUs can determine, based on their location in the system or connection, what function or role they will perform. For example, a resistor can be placed in a connection with an RCU, and based on the resistance, the RCU determines its respective function. Other ways of identifying the function or role of a RCU can be used. Supervisory robotic level controller RCU (#1) 238 may be a high level controller and, in some embodiments, installed on a Power PC single board computer having a CAN node to communicate using the SAE J1939 standard to provide primary instructions to one or more VCUs 214, 222.

Various elements of the vehicle level control section 202 are in communication with elements of the robotic level control section 204. For example, the supervisory robotic level controller RCU (#1) 238 is in communication with the power center 208, controller 218, and dashboard VCU (#2) 222. The supervisory robotic level controller RCU (#1) 238 receives input from various sensors and provides commands for operation of a vehicle in an autonomous mode. U.S. patent application Ser. Nos. 10/972,082; 10/971,718; and 10/971,724, incorporated by reference in their entireties herein, describe exemplary autonomous modes and control thereof.

In the embodiment shown in FIG. 2A, the supervisory robotic level controller RCU (#1) 238 receives input from a GPS system 240 and from a compass 242. The GPS system 240 can be one such as is available from NavCom Technology, Inc. of Torrance, Calif. These sensors provide position and heading information to the supervisory robotic level controller RCU (#1) 238 for navigation purposes. Embodiments of the present invention may comprise other sensors as well. For example, one embodiment comprises an inertial measurement unit (IMU), which measures acceleration of the vehicle in each direction. The supervisory robotic level controller RCU (#1) 238 is also in communication with the rear perception RCU (#3) 244. The rear perception RCU (#3) 244 may receive sensor input from a laser scanner 252 via an RS422 port. Sick AG of Germany manufacturers a laser scanner 252 that may be used in embodiments of the invention.

The supervisory robotic level controller RCU (#1) 238 in the embodiment shown in FIG. 2A is also in communication with the forward perception RCU (#2) 254 and a dashboard operator control unit (OCU) 256 through the forward perception RCU (#2) 254. The term dashboard OCU 256 may be used interchangeably with the term dashboard control unit, or dashboard OCU. In the embodiment shown, the dashboard OCU 256 comprises an iPAQ™ model personal digital assistant as manufactured by Hewlett-Packard of Palo Alto, Calif. As stated above and illustrated in FIGS. 6 and 7, the dashboard OCU 256 may be a local control unit detachably connected to the vehicle, such as on the dashboard, and may provide an operator with the ability to input, at least, local vehicle controls. For example, the operator may use the dashboard OCU 256 to input a command for the vehicle to operate in a "Follow Me" mode, teleoperation mode, teaching playback mode, or GPS waypoint mode. Additional local functions may include vehicle headlight control and payload functions. The dashboard OCU 256 can receive CAN data over an Ethernet or a CAN network and display the CAN data to the operator.

In some embodiments, the dashboard OCU 256 communicates with the RCUs, such as supervisory robotic level controller RCU (#1) 238, over an Ethernet network using a virtual terminal protocol. The virtual terminal protocol may be based on the ISO 11783-6 standard. For example, the RCUs may encapsulate CAN data or data generated using software into Ethernet byte packets and send the packets to the dashboard OCU 256. One acceptable type of software is the iRobot Aware™ brand as manufactured by iRobot Corp. of Burlington, Mass. The virtual terminal protocol can, for example, group eight bytes of the CAN data or other data together into an Ethernet packet and send the data to the dashboard OCU 256. The dashboard OCU 256 may receive and display the data. In some embodiments, the dashboard OCU 256 strips the CAN data or other type data from the Ethernet packet and displays the stripped data. The dashboard OCU 256 can read and display CAN or other data received over an Ethernet network and may not be required to otherwise process the data before displaying the received information.

It is further advantageous for the remote OCU 250 to include a connector having the same physical and data link layer (e.g., Ethernet) as the local packet network, such as an Ethernet network, connected to the remote OCU's 250 radio network in a pass-through manner. In this manner, any device plugged into a connector to the vehicle's Ethernet network has a largely transparent pass-through to the controller or accessory plugged into the connector on the remote OCU 250, as communications extend using the same transport layer (e.g., TCP/IP) through the Ethernet network, through the radio link to the remote OCU 250, through the remote OCU's 250 connector with the same physical and data link layer to the accessory or controller. The accessory or controller may also be a payload used for testing, etc., as the network does not know what device is on the vehicle or on the remote OCU 250 network. The remote OCU 250 can include a switch or router compliant with the common physical and data link layer. The router may also include a connector for a peripheral bus (USB, IEEE serial connections) or WPAN, which also may include conversion to the common transport layer used by the other elements.

In this manner, the local packet network employs short-range local physical and data link layers (e.g., Ethernet, mesh, wireless USB, ZigBee), and a connection from the vehicle to the remote OCU 250 is a long-range physical and data link layer (wireless, e.g., one or more of 802.xx, 900 MHz radio, satellite, Line of Sight laser), each of these sharing a transport layer (E.g., TCP/IP). Optionally, connectors on the remote OCU 250 can connect a device plugged into the remote OCU 250 through the transport layer protocol to any connector on the vehicle (passenger compartment or payload) and any device on the vehicle plugged into such a connector. Preferably, all of these connectors correspond to physical layer addresses of the devices attached thereto. Further preferably, at least one server address (e.g., DHCP) is provided on the local packet network to provide network addresses compliant with the transport layer to any device connected to the connector (payload, truck bed, mast, passenger compartment, or remote OCU connectors). Any connector can be a multi-connector hub, or can be provided with a switch or router. A service discovery protocol such as SLP, UPnP, Bonjour or other zero-configuration or automatic discovery service can be provided to the processing circuits, the remote OCU 250, and/or any payload attachable to the local packet network.

Figure 19:
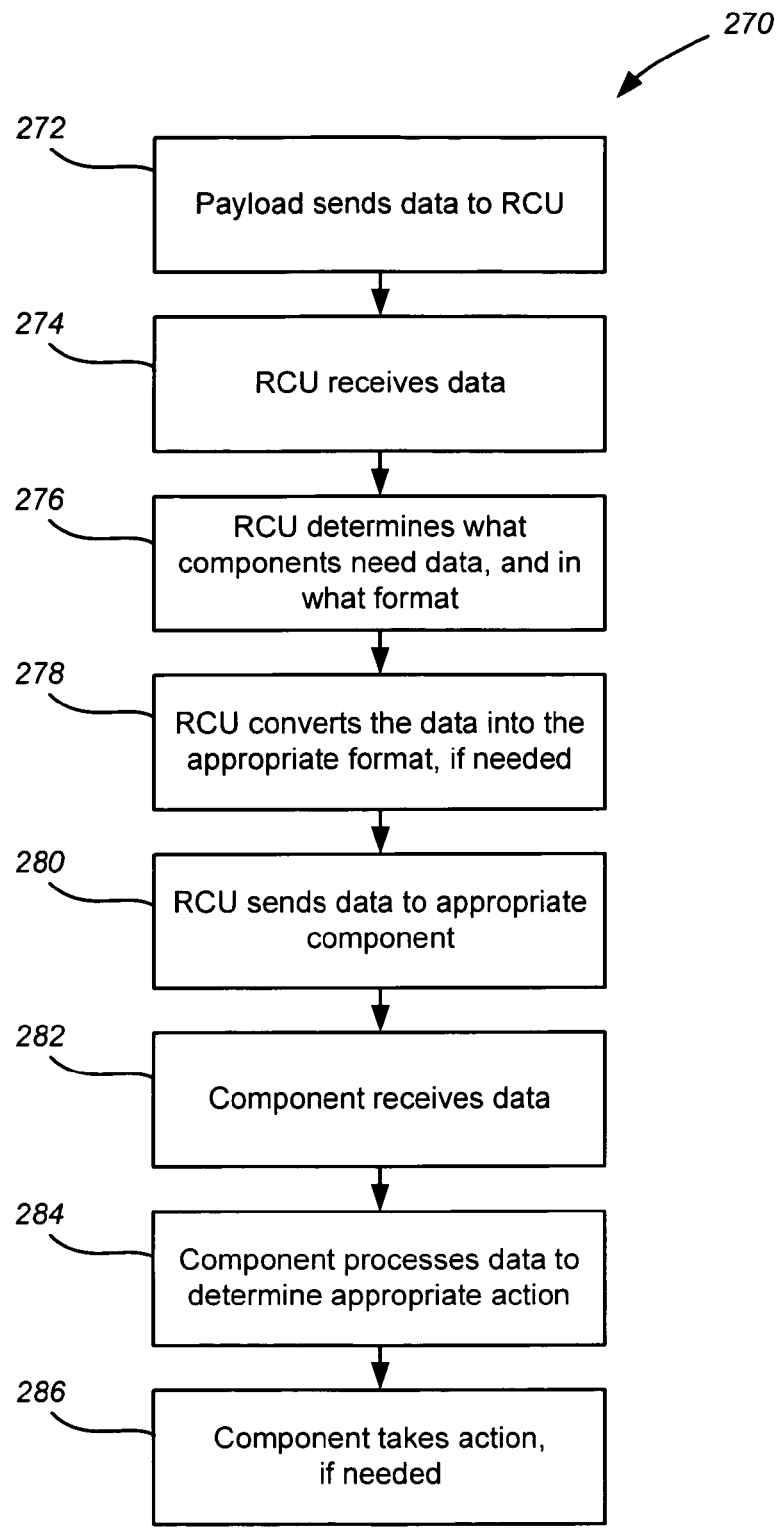
FIG. 19 is a flow chart diagram illustrating a method of transmitting data over networks in one embodiment of the invention.

In some embodiments of the present invention, messages from the RCUs are constructed by creating an array comprising CAN data in a proper byte order and then sending the array over the Ethernet network using a user datagram protocol (UDP) or hypertext transfer protocol (HTTP). As illustrated in FIG. 19, in box 272 a payload connected to an interface, such as front payload CAN interface 236 in FIG. 2A, may send data to an RCU on a network, for example the Ethernet or CAN network. In box 274, an RCU may receive the data, and in box 276 the RCU may process the data by determining the components that need to receive the data, and the proper data format. The RCU can access, for example, a table in memory of the location of various components and the network associated with the path between the RCU and the component. In box 278, the RCU converts the data into an appropriate format, if needed, to send the data over the network and in box 280 then transmits the data to the appropriate component, such as the dashboard OCU 256 shown in FIG. 2A. For example in some embodiments, the RCU can access a table in memory that contains a list of components and the type of data that the components can read and process. In some embodiments, the table in memory is updated when a payload is connected to an interface. The following is an example of the byte ordering of two messages sent from an RCU to the dashboard OCU 256 according to some embodiments of the present invention:

Example 1

Message: Change Numeric Value;
Data Length: 8;
Byte 1: VT function=168;
Byte 2: Object ID of object to change (Least Significant Byte);
Byte 3: Object ID of object to change (Most Significant Byte);
Byte 4: 255; and
Byte 5-8: Numeric value (Values greater than 1 byte are transmitted Least Significant Bit first).

Example 2

Message: Change String Value;
Data Length: Depends on string size;
Byte 1: VT function=179;
Byte 2: Object ID of object to change (Least Significant Byte);
Byte 3: Object ID of object to change (Most Significant Byte);
Byte 4: Total number of bytes in string to transfer (Least Significant Byte);
Byte 5: Total number of bytes in string to transfer (Most Significant Byte); and
Byte 6-*n*: String value (array of ASCII characters).

Virtual terminal protocol may also be used during communication between payloads and the vehicle's control system or any components that communicate on the vehicle's network. In box 282 of FIG. 19, the component receives the data transmitted by the RCU. In box 284, the component may process the data to determine the appropriate action to take in response to the data. Then in box 286, the component can take the necessary action, if needed. For example, a chemical detection payload may be connected to front payload CAN interface 236 that detects the presence of a chemical harmful to humans and the general location of the chemical source. The chemical detection payload sends a CAN signal indicating the presence of harmful chemicals, the identification of the chemical, and the approximate direction, relative to the vehicle, to forward perception RCU (#2) 254. The forward perception RCU (#2) 254 packets the CAN data into Ethernet packets using a virtual terminal protocol and sends the Ethernet packet to dashboard OCU 256. The dashboard OCU 256 strips the Ethernet data, reads the CAN data and processes the data to determine the information and options to display on the dashboard OCU 256. A user, such as an operator or passenger in the vehicle while the vehicle is operating in autonomous or manual mode, may read the displayed information and make adjustments to the vehicle's travel and/or provide commands to one or more payloads by providing the commands into the dashboard OCU 256. The dashboard OCU 256 may process the commands entered by the user, packet the CAN data into Ethernet packets using the virtual terminal protocol, at least in some embodiments, and send the Ethernet packets to forward perception RCU (#2) 254. The forward perception RCU (#2) 254 may strip the Ethernet packet, process the command CAN data and send the commands to the appropriate vehicle control system component, payload, and/or OCU 250, 256.

In the embodiment shown, the supervisory robotic level controller RCU (#1) 238 is also in communication with a camera and brake RCU (#4) 262. The camera and brake RCU (#4) 262 is in communication with a rear drive camera 264 and a forward drive camera 268. The camera and brake RCU (#4) 262 is also in two-way communication with the steering actuator 228 and supervisory vehicle level controller VCU (#1) 214 of the vehicle control section 202 shown in FIG. 2B.

The layout of the various controllers and sensors shown in FIGS. 2A and 2B may be implemented in a variety of ways in embodiments of the present invention. For example, the various controllers may be combined or split in various ways depending on the number and types of sensors used and depending on the configuration of the vehicle. Also, the various sensors and instruments may be utilized in various ways. For example, embodiments of the present invention may utilize sensor fusion to operate efficiently and effectively. Sensor fusion allows the vehicle to operate even when certain sensors are inoperative.

Robotic Control Unit

In one embodiment of the present invention, an RCU can contain one or more of a processor and associated memory, such as a single board computer with a microprocessor, a network switch, such as an Ethernet switch, an actuator controller, such as a reprogrammable motor controller, an actuator amplifier, such as a motor amplifier, and a power supply within a single mountable housing.

Executable code may be stored in memory of the RCU that can be executed by a CPU to enable the RCU to execute and arbitrate among robotic control behaviors. Each RCU in the robotic control system may be provided with multiple executable code parts for different modular roles within the control system. For example, each RCU can include executable code for supervisory role, for actuator control, for sensor monitoring, etc. The RCUs can be configurable to execute only a selected portion of the executable code appropriate for the role of the particular RCU. Examples of the parts of the executable code can be behavior arbitration code, behavior code, sensor driver code, drive controller code, actuator controller code, database management code, database data, and data converter code. Each RCU can determine the function or role they will perform and what executable code they will perform based on location, connections, or other suitable methods as described above. This provides for the interchangeability of the RCUs.

Figure 3A:
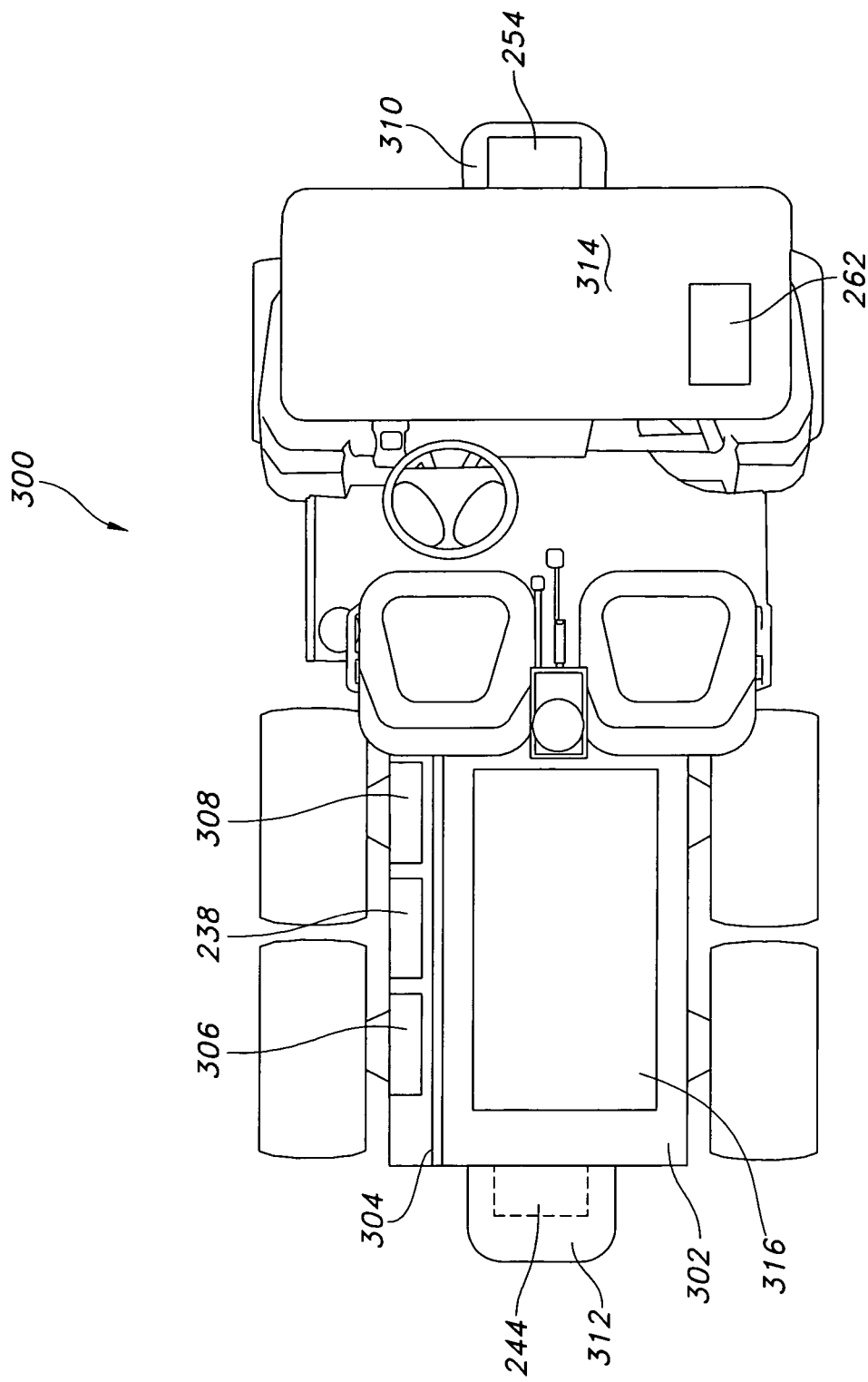
FIGS. 3A-B are diagrams of an illustrative vehicle including vehicle control units in one embodiment of the present invention.
Figure 3B:
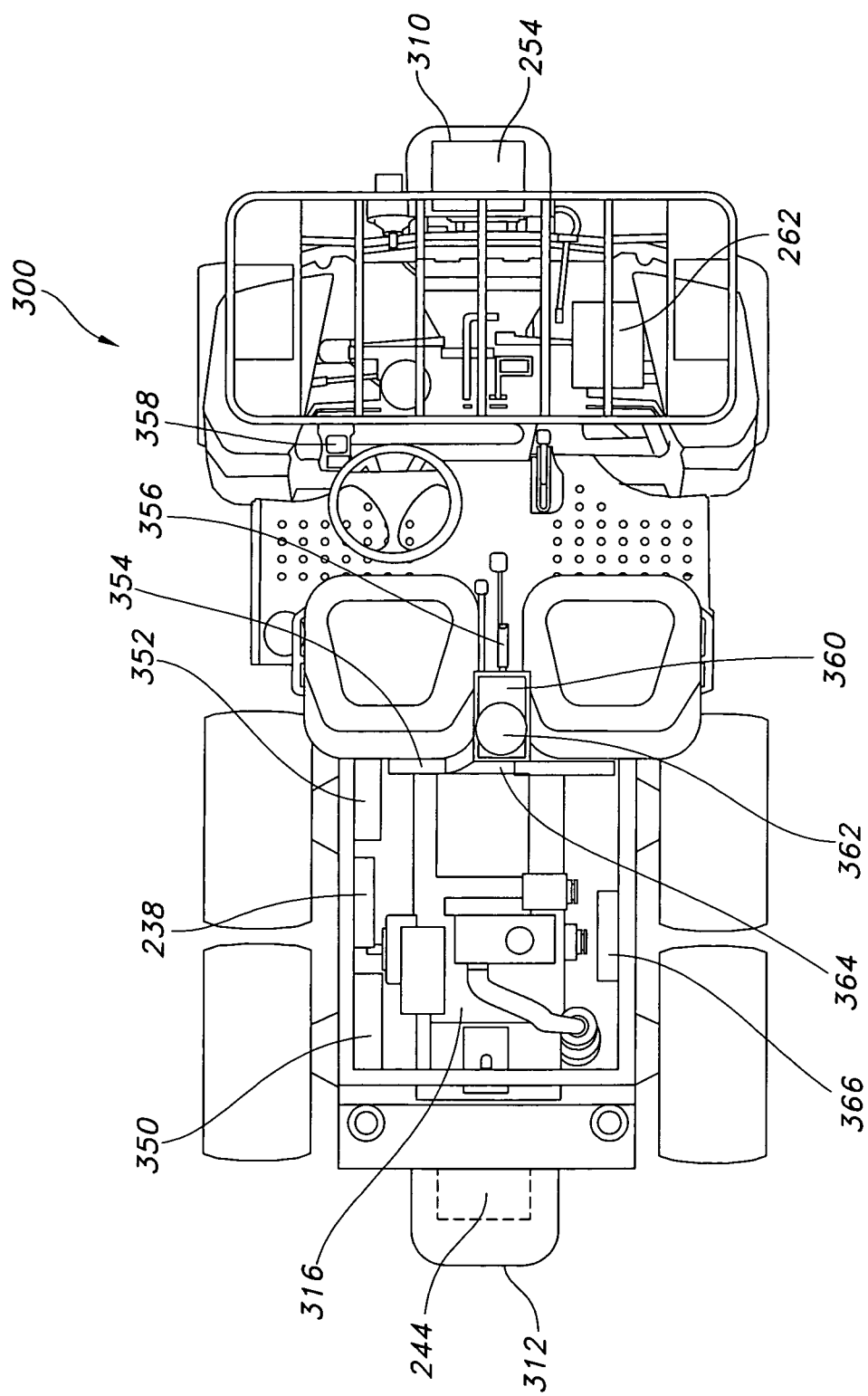
Figure 8:
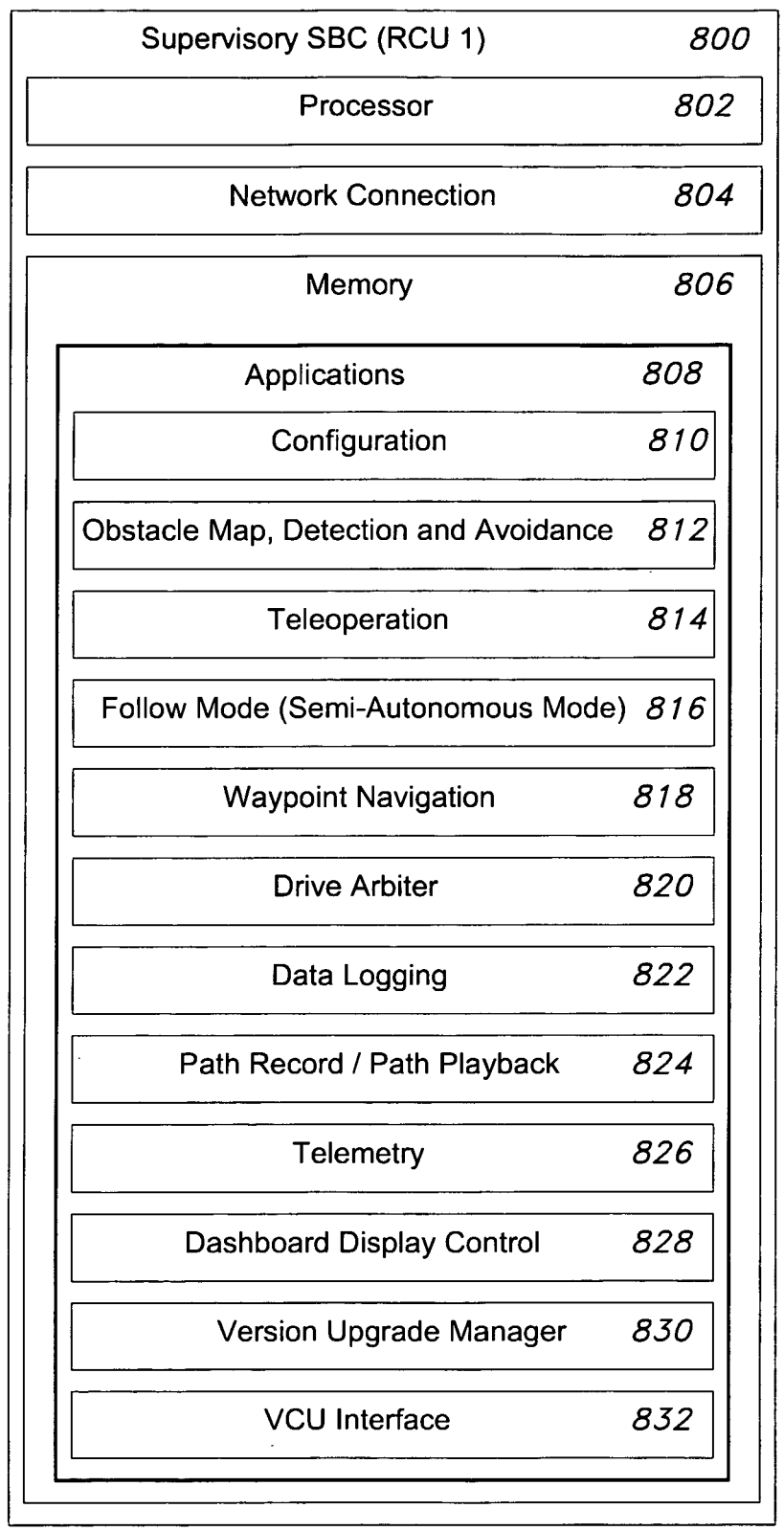
FIG. 8 illustrates a single board computer software architecture for a supervisory RCU according to one embodiment of the present invention.
Figure 9:
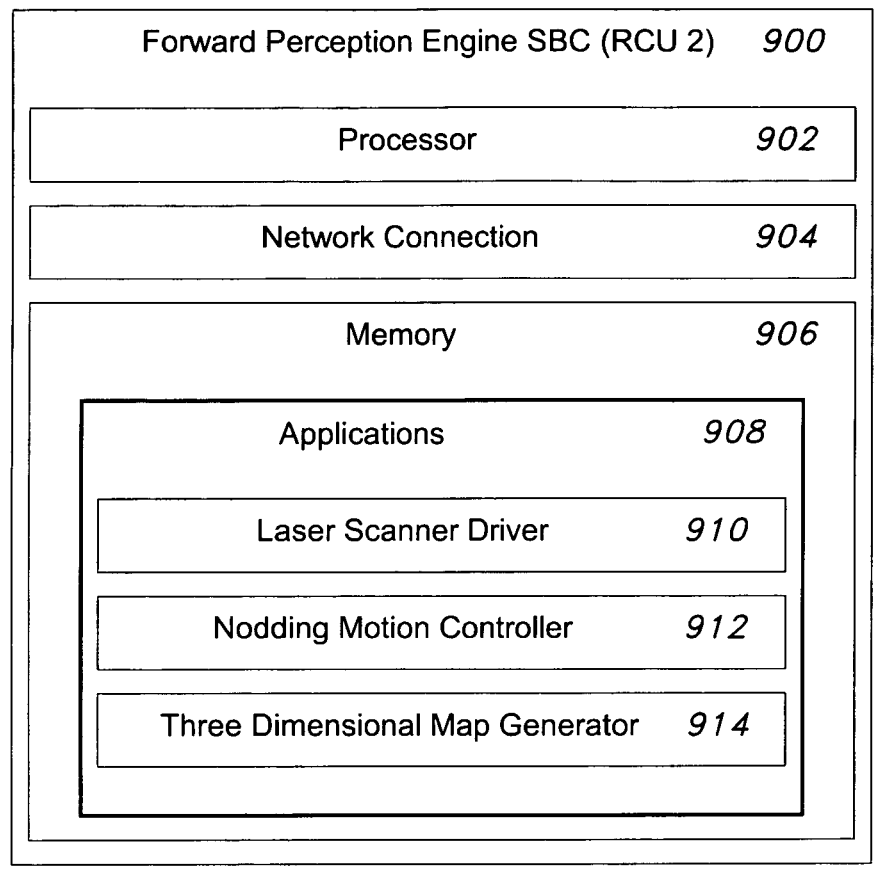
FIG. 9 illustrates a single board computer forward perception engine software architecture for an RCU according to one embodiment of the present invention.
Figure 10:
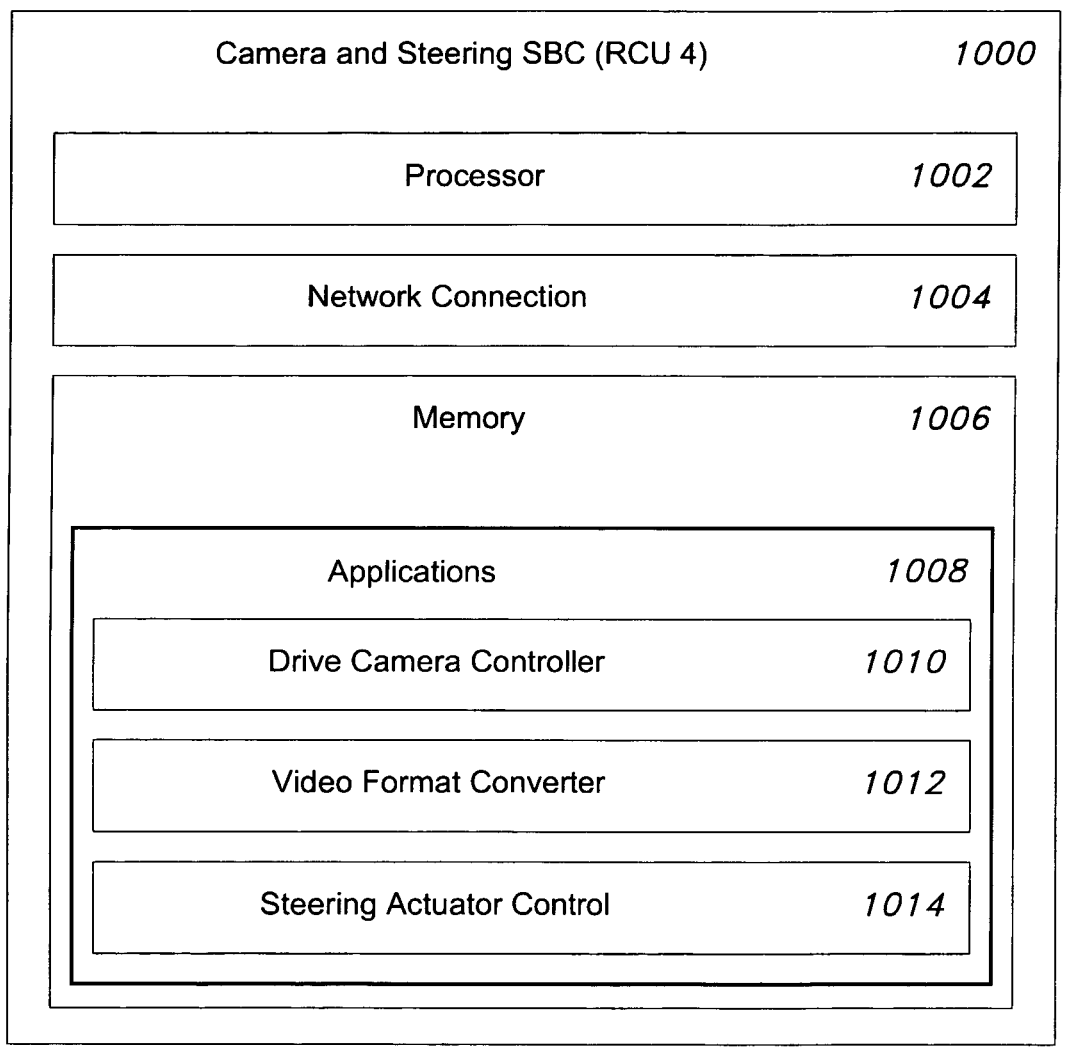
FIG. 10 illustrates a single board computer camera and steering software architecture for an RCU according to one embodiment of the present invention.

As explained above, multiple RCUs can be used in a robotic control system of a vehicle or mobile platform in embodiments of the present invention. The RCUs can work together, such as for example as explained with reference to the embodiments shown in FIGS. 1 and 2, to distribute the processing and computing of the robotic control system. In one embodiment of the present invention, a distributed robotic control system for a robotic vehicle or mobile platform includes a robot platform having a body (e.g., as shown in FIGS. 3A-3B) and a motor connected to a drive. There may be a defined set of robotic control routines selected from behavior arbitration and behaviors. There may be sensor drivers, drive/actuator controllers, database management and databases, or data converters. The robotic control system may further include, a plurality of interchangeable mountable units (e.g., RCUs 238, 254, 244, 262), each RCU including a power input, a plurality of network connectors, and a multi-pin connector available on the exterior of the RCU. Each RCU may further include a microprocessor board with code execution dynamic memory (e.g., SDRAM). The microprocessor board may further include a plurality of protocol transceivers, the multi-pin connector being capable of communicating with the plurality of protocol transceivers sensors. The microprocessor board may further include nonvolatile memory including executable code, each microprocessor board of an RCU being configurable to execute a selected part of the executable code. The microprocessor board may further include a packet network switch, each of the plurality of network connectors being capable of connection to a packet network distributed through the body and communicating with the packet network switch, the packet network being capable of relaying instructions for or from the microprocessor board. The plurality of microprocessor boards can be provided with instructions to load and execute discrete ones of the defined set of robotic control routines, as illustrated in FIGS. 8-10, such that all of the defined set of robotic control routines are executed among the plurality of RCUs.

Software Architecture

FIGS. 8-18 illustrate embodiments of single board computer (SBC) software architecture for selected robotic control units. One embodiment of an SBC 800 for a supervisory robotic control unit is shown as a high level block diagram in FIG. 8. The supervisory SBC 800 includes a processor 802 and network connection 804. The network connection 804 may be one or more network connections. Examples of such network connections 804 include Ethernet TCP/IP, USB, and CAN connection such as J1939.

The network connections 804 are adapted to connect with a plurality of devices outside of supervisory SBC 800, such that the supervisory SBC 800 can receive and send a plurality of types of data and/or control signals. The supervisory RCU may also include a computer-readable medium, such as memory 806. Memory 806 may any type of memory. Examples of memory 806 include random access memory ("RAM"), read-only memory ("ROM"), optical storage, and magnetic storage. Memory 806 may include a data storage and/or persistent data storage to store various received or computed data and executable code.

Examples of executable-code include an operating system (not shown), such as for example BlueCat Linux or DSP basic input/output system (BIOS), a data transport (not shown) that includes software, such as for example iRobot Aware™, to assist in the supervisory SBC 800 communicating with outside devices, and/or applications 808. The applications 808 can include one or more supervisory RCU functional code and drive behaviors. For example, the applications 808 may include configuration code 810 that reads configuration files from storage, such as persistent storage, and puts these values into appropriate locations in the data transport.

The applications 808 may also include an obstacle map, detection and/or avoidance code 812, teleoperation code 814, follow mode 816, waypoint navigation code 818, drive arbiter 820, data logging code 822, path playback code 824, telemetry code 826, dashboard display control 828, version upgrade manager 830, and vehicle control unit (VCU) interface 832. Embodiments of the applications 808 are described in more detail below with regard to FIGS. 11-18.

FIG. 9 illustrates one embodiment of software architecture for a forward perception engine SBC 900 included on a second RCU. The forward perception engine includes a processor 902 and network connection 904. The network connection may include one or more different types of network connections, as described above, that are adapted to receive and send data over one or more networks. The forward perception engine SBC 900 may also include a readable medium, such as memory 906. Memory 906 may any type of memory and may include a data storage and/or persistent data storage to store various received or computed data and executable code.

An example of such executable code includes applications 908. The applications 908 can include a variety of software code and behavior code. For example, the applications 908 can include a laser scanner driver 910, a nodding motion controller 912, and a three-dimensional map generator 914. Embodiments of a laser scanner driver, nodding motion controller, and three-dimensional map generator are described in more detail below.

Embodiments of the present invention may also include a third RCU having an SBC that includes a rear perception engine (not shown). The rear perception engine can include a laser scanner driver that reads configuration data, configurations the laser scanner for continuous output of range data, reads range data, and publishes the data to a network message queue for use by a supervisory RCU. The rear perception engine may include similar or the same behavior code, architecture, or otherwise, or the forward perception engine.

FIG. 10 illustrates one embodiment of a fourth RCU that can be a camera and steering RCU including an SBC 1000. The camera and steering SBC 1000 may include a processor 1002 and one or more network connections 1004. The network connections 1004 can send and receive data over a network to other devices or other RCUs.

The camera and steering SBC 1000 may also include a readable medium, such as memory 1006. Memory 1006 may any type of memory and include a data storage and/or persistent data storage to store various received or computed data and executable code. An example of such executable code includes applications 1008 that include one or more software programs and/or behavior code. Examples of such programs or code include a drive camera controller 1010, a video format converter 1012, and a steering actuator control 1014. Embodiments of a drive camera controller, video format converter, and steering actuator control are described in more detail below.

Figure 11:
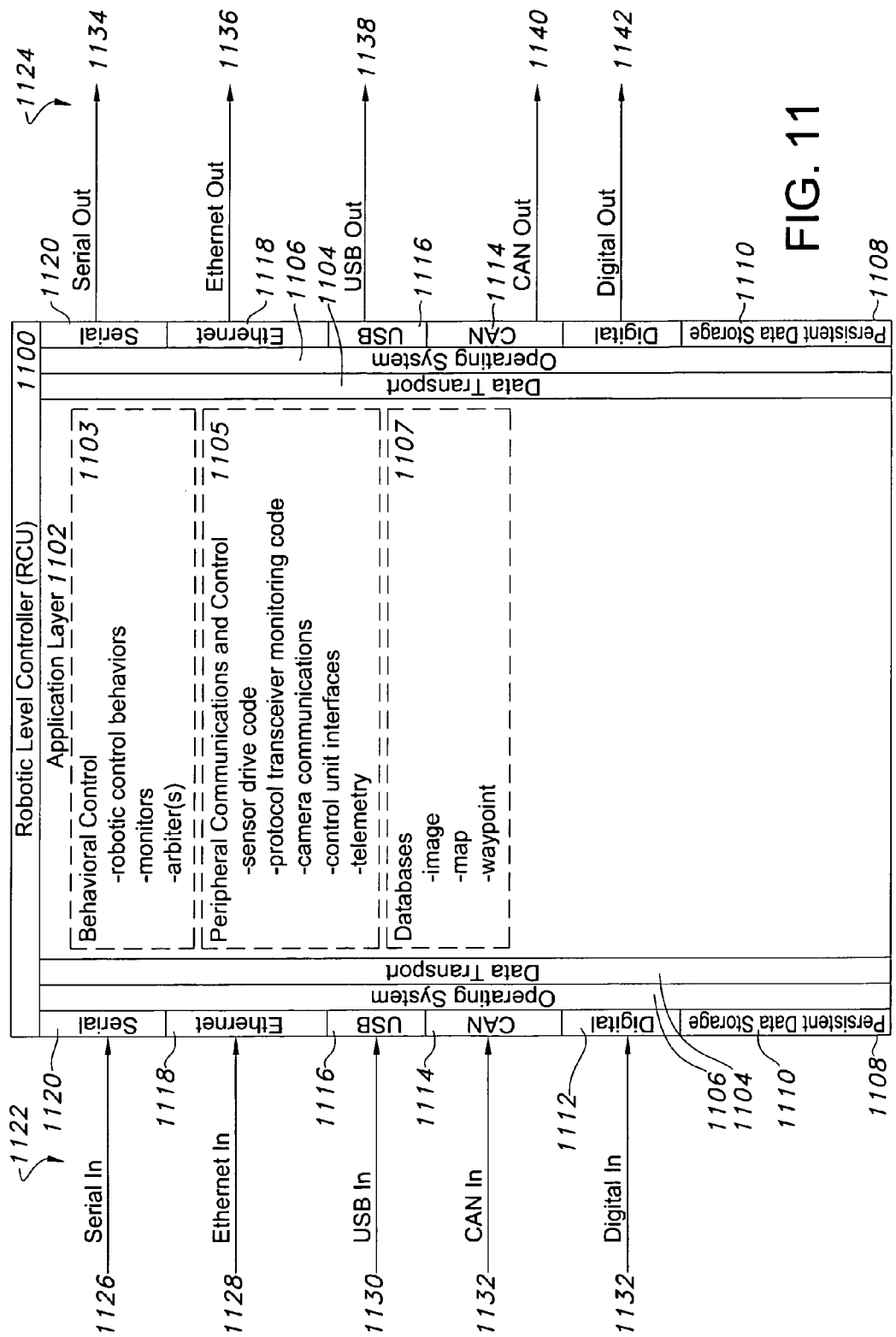
FIG. 11 illustrates an RCU software architecture according to one embodiment of the present invention.
Figure 12:
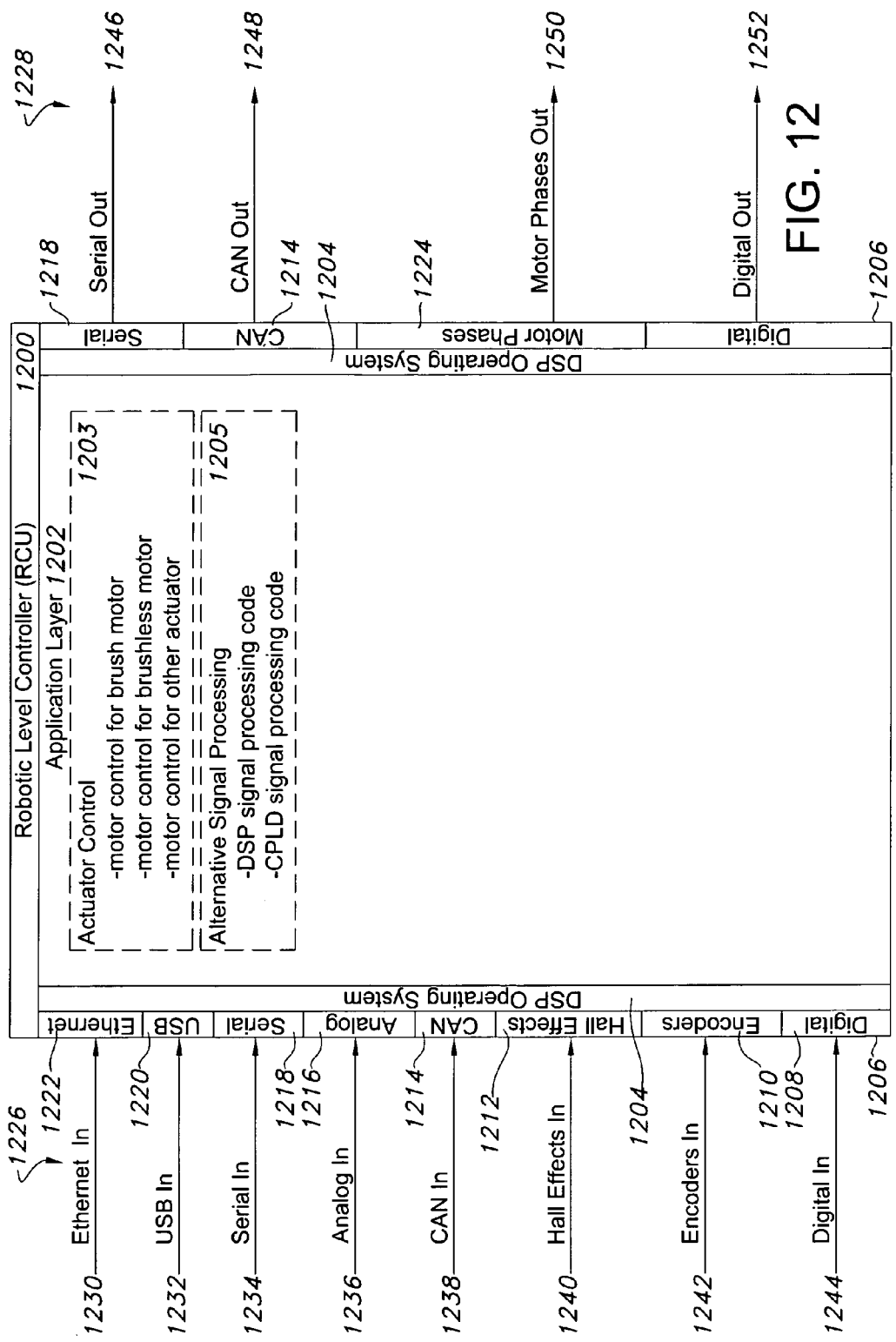
FIG. 12 illustrates an RCU software architecture according to another embodiment of the present invention.

In some embodiments of the present invention, RCUs may be provided having a software architecture that includes a application layer with a one or more applications and types of applications. RCUs may include only one application, while other RCUs are configured include more than one application. In some embodiments, the applications may be uploaded to the RCUs. FIGS. 11-12 illustrate embodiments of a robotic level controller and including one or more application types and network connections. FIG. 11 illustrates a software architecture for a robotic level controller 1100 that includes a application layer 1102 that can include one or application types. Examples of such application types include behavioral control 1103, peripheral communications and control 1105, and databases 1107. The behavioral control 1103 may include applications such as robotic control behaviors, monitors, and/or arbiters. These and other types of behavioral controls are described below with reference to FIGS. 13-18. The peripheral communications and control 1105 may include sensor drive code, protocol transceiver monitoring code, camera communications, control unit interfaces, and telemetry. Databases 1107 may include image, map, and waypoint databases.

The RCU software architecture 1100 may also include a data transport layer 1104 and an operating system layer 1106. The operating system layer 1106 may include an operating system, such as a Linux operating system, or any type of signal processing code. A data storage/network connection layer 1108 may also be included. The data storage/network connection layer 1108 may include a data storage, such as persistent data storage 1110 and one or more network connections, such as digital 1112, CAN 1114, USB 1116, Ethernet 1118, and serial 1120. The network connections may receive a plurality of data and types of data 1122 and output a plurality of data and types of data 1124.

FIG. 12 illustrates another embodiment of a robotic level controller software architecture 1200 that can include an application layer 1202 that includes one or more application types having one or more applications. For example, the application layer 1202 may include actuator control application types 1203 and/or alternative signal processing 1205. The actuator control 1203 may include motor controls for brush motors, motor controls for brushless motors, motor control for other actuators, and/or other motor control code. The alternative signal processing 1205 may include DSP signal processing code, and/or CPLD signal processing code. The RCU software may also include a DSP operating system layer 1204 that can include a DSP BIOS or other option operating system. An example of a DSP BIOS includes Texas Instruments™ DSP BIOS.

FIGS. 13-18 illustrate particular embodiments of RCU software architecture, including architecture associated with applications, data transport, and physical layer arrangements associated with different exemplary configurations. The embodiments of RCU software architecture described herein are RCU having particular applications and perform certain functions that may be determined when the RCU is designated as such and includes the appropriate applications or executable code. The RCUs may be devices with the same electronic and physical configuration, but may have the same or different software loads.

Figure 13:
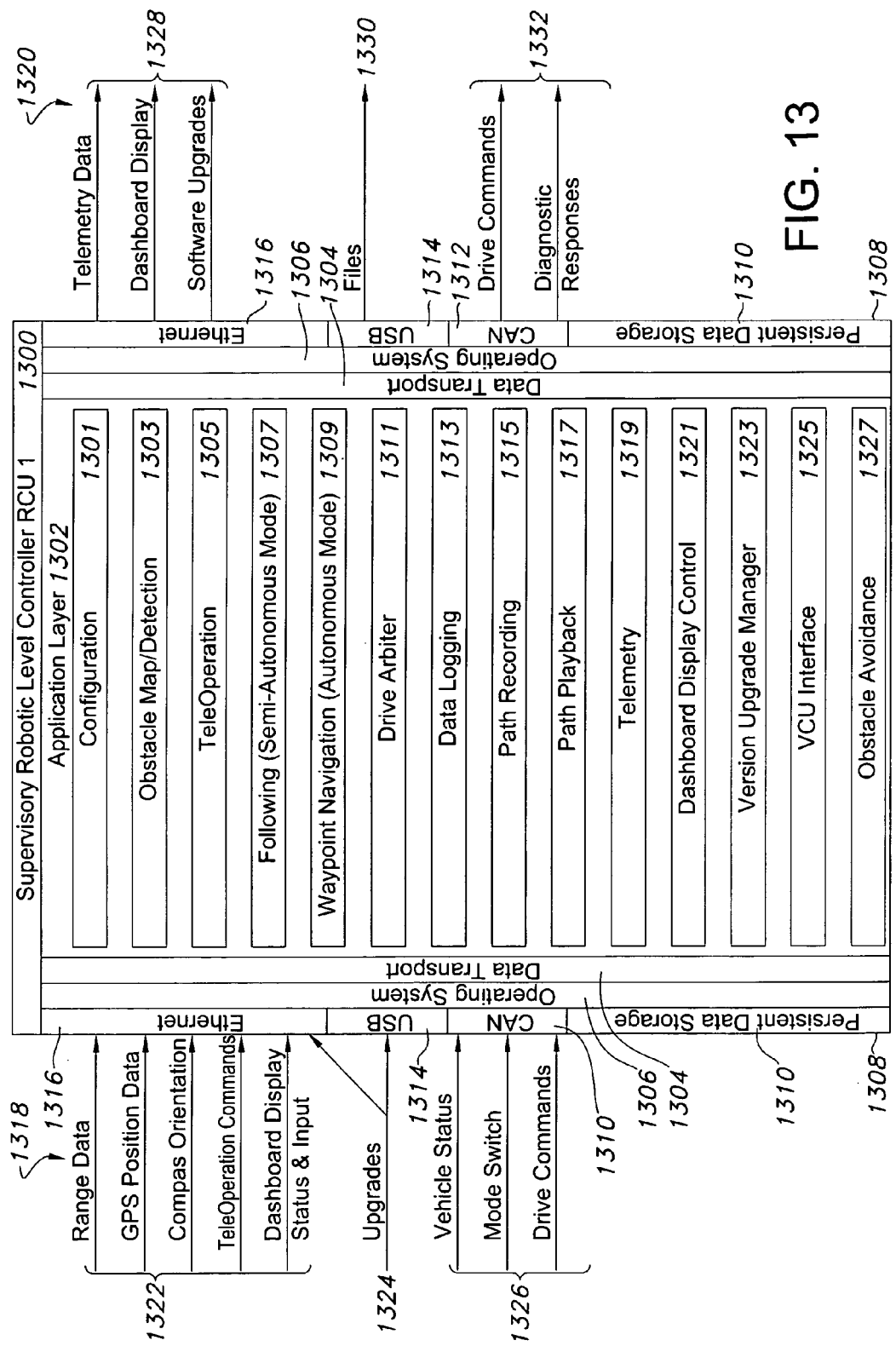
FIG. 13 illustrates a supervisory RCU software architecture according to one embodiment of the present invention.

One embodiment of a supervisory robotic level controller RCU software architecture 1300 is shown in FIG. 13. The RCU may become a supervisory RCU after being designated as such and receiving the appropriate applications. The RCU software architecture 1300 can include one or more layers. For example, the layers may include an application layer 1302 that includes computer-executable code, such as applications, a data transport layer 1304 that includes executable code, such as for example iRobot Aware™, to assist in the RCU communicating with outside devices, and/or applications on the application layer 1802, an operating system layer 1806 that includes an operating system such as BlueCat Linux, and a data storage/network connection layer 1808 that can send an receive data from other devices and store data. The data storage/network connection layer 1808 may include a data storage, such as a persistent data storage 1810.

The data storage/network connections layer 1808 may include one or more network connections adapted to connect with a plurality of devices outside of the RCU and send and receive data or control signals. The network connections may include a CAN connection 1812, such as a J1939 connector, a USB connector 1814, and an Ethernet connector 1816. The network connectors may receive a plurality of data 1818 or send a plurality of data 1820. Examples of Ethernet data 1822 received by the Ethernet connector include laser scanner range data, GPS position data, compass orientation data, teleoperation commands from a remote operator control unit (OCU), dashboard display status and input, and software upgrades. An example of USB data 1824 also includes software upgrades. Examples of CAN data 1826 includes vehicle status information, vehicle mode switch, and diagnostic commands from CAN diagnostic ports. Examples of transmitted Ethernet data 1828 includes telemetry data to a remote OCU, dashboard display instructions, and software updates to other RCUs. An example of transmitted USB data 1830 includes files. Examples of transmitted CAN data 1832 includes drive commands to a supervisory VCU and diagnostic responses to CAN diagnostic port.

The application layer 1802 can include one or more applications, such as RCU functional code and drive behaviors. For example, the applications may include configuration code 1801 that reads configuration files from storage, such as persistent storage, and puts these values into appropriate locations in the data transport. The applications may also include an obstacle map and detection 1803. The obstacle map and detection code can receive input range and odometry data and construct a two-dimensional obstacle map.

Other applications can include teleoperation code 1805 that receives input commands from a remote OCU and outputs a trajectory set for use by a drive arbiter 1811 and several discrete values and a follow mode or semi-autonomous mode 1807 that receives obstacle data from the obstacle map to locate a target or object to follow and outputs trajectory sets for use by the drive arbiter 1811. Waypoint navigation code 1809 may also be included that can receive input waypoint values from a chosen path an output a trajectory set for use by the drive arbiter 1811. The drive arbiter 1811 may be included with the applications to receive input trajectory sets and priorities from various drive behaviors, obstacle data form the obstacle map and configuration data from various configuration publications. The drive arbiter 1811 may also output selected trajectory data to actuators or other devices outside of the RCU.

The applications may also include data logging code 1813 that can receive status data from vehicle sensors and writes data to a data storage, such as persistent data storage 1810. After receiving an operator command, the data logging code 1813 can copy data wirelessly or on a wireline to an OCU or removable data storage device. The applications may also include path record 1815 and path playback 1817 code. The path record code 1815 can receive location data from vehicle sensors and inputs from an operator and write the data, such as representations of path waypoints, to data storage, such as persistent data storage. The path playback code 1817 can receive a path as designated by an operator and play the waypoints included with that path to waypoint navigation.

The applications may also include telemetry code 1819 that can receive status data from vehicle sensors and sends packets to a remote OCU. A dashboard display control 1821 may also be included that can receive status data from vehicle sensors and inputs from a dashboard display and send display instructions to the dashboard display.

The applications may also include a version upgrade manager 1823 and VCU interface 1825. The version upgrade manager 1823 can receive software upgrades and distribute the software upgrades throughout other RCUs. The VCU interface 1825 can receive driving and diagnostic commands and send driving commands to the VCU via appropriate CAN messages and sends diagnostic messages to other RCUs and returns their reports to the VCU. Obstacle avoidance code 1827 may also be included. The obstacle avoidance code 1827 can receive input trajectories from the drive arbiter 1811 and obstacle data from the two-dimensional obstacle map and scores these trajectories according to obstacle avoidance rules.

Figure 14:
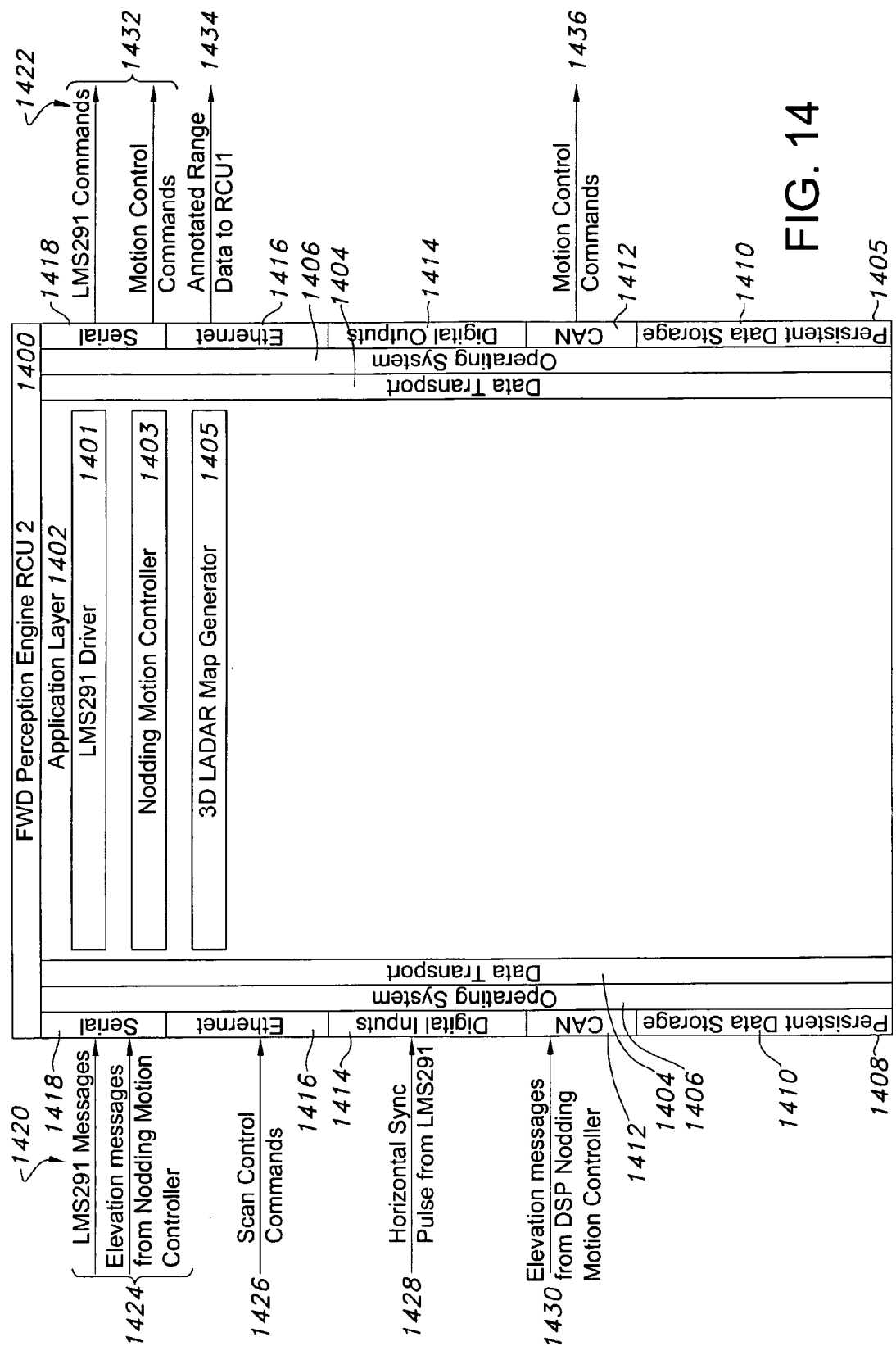
FIG. 14 illustrates a forward perception engine RCU software architecture according to one embodiment of the present invention.

FIG. 14 illustrates one embodiment of software architecture for a forward perception engine RCU 2 1400. The RCU may become a forward perception engine RCU after being designated as such and receiving the appropriate applications. The forward perception engine RCU 2 software architecture 1400 may include one or more software layers. For example, the layers may include an application layer 1402 that includes computer-executable code, such as applications, a data transport layer 1404 that includes executable code, such as for example iRobot Aware™, to assist communicating with outside devices, and/or applications on the application layer 1402, an operating system layer 1406 that includes an operating system such as BlueCat Linux, and a data storage/network connection layer 1408 that can send an receive data from other devices and store data. The data storage/network connection layer 1408 may include a data storage, such as a persistent data storage 1410.

The data storage/network connections layer 1408 may include one or more network connections adapted to connect with a plurality of devices outside of the RCU and send and receive data or control signals. The network connections may include a CAN connection 1412, such as a J1939 connector, a digital connector 1414, an Ethernet connector 1416, and a Serial connector 1418, such as an RS232 or RS 422 connector. The network connectors may be used to receive a plurality of data 1420 or send a plurality of data 1422. Examples of Serial data 1424 received by the serial connector 1418 include messages from a laser scanner, such as LMS291, and elevation messages from a nodding motion controller board. An example of Ethernet data 1426 includes scan control commands. An example digital data 1428 includes horizontal sync pulse data from an LMS291 laser scanner. An example of CAN data 1430 includes elevation messages from a nodding motion controller board. Examples of transmitted serial data 1432 includes commands to a laser scanner, such as LMS291, and motion control commands, such as to a nodding motion controller board. An example of Ethernet data 1434 includes range data to another RCU, such a via a message queue. An example of transmitted CAN data 1436 includes motion control commands, such as a nodding motion controller board.

The application layer 1402 can include one or more applications, such as RCU functional code and drive behaviors. For example, the applications can include a laser scanner driver, such as LMS291 driver 1401, a nodding motion controller 1403, and a three-dimensional map generator 1405. The LMS291 driver 1401 may read configuration data that configures a laser scanner, such as for example LMS 291, for continuous output of range data at a particular frequency. One example of such frequency is 75 Hz. The LMS291 driver 1401 may also read range data and timestamp it and publish the data to a network message queue for use by a three-dimensional map generator.

The nodding motion controller 1403 can read configuration data, receive commands to control nodding/scanning behavior, and manipulate the scanning hardware according to the preceding commands. The nodding motion controller 1403 may also receive horizontal sync pulses as an interrupt and notes the time of the last interrupt. In addition, the nodding motion controller 1403 can receive elevation messages from a nodding motion controller board, compute the time of the start of the last scan based on empirically determined fixed offset from horizontal sync pulses, uses this time to timestamp the elevation data, and sends time stamped elevation data to the three-dimensional map generator 1405.

The three-dimensional map generator 1405 can read configuration data, read scans from the laser scanner driver 1405, read time stamped elevation messages from the nodding motion controller 1403, and compute the elevation of the nodding mechanism at the start of the last range scan based on, for example, sinusoidal motion of the nodder. The three-dimensional map generator 1405 may also mark each scan with computed elevation at the start of the scan, publish range data annotated with elevation information to a network message queue for use by a supervisory RCU, and detect a loss of synchronization due to errors and resynchronize by discarding data until a match can be achieved between all timestamps.

Figure 15:
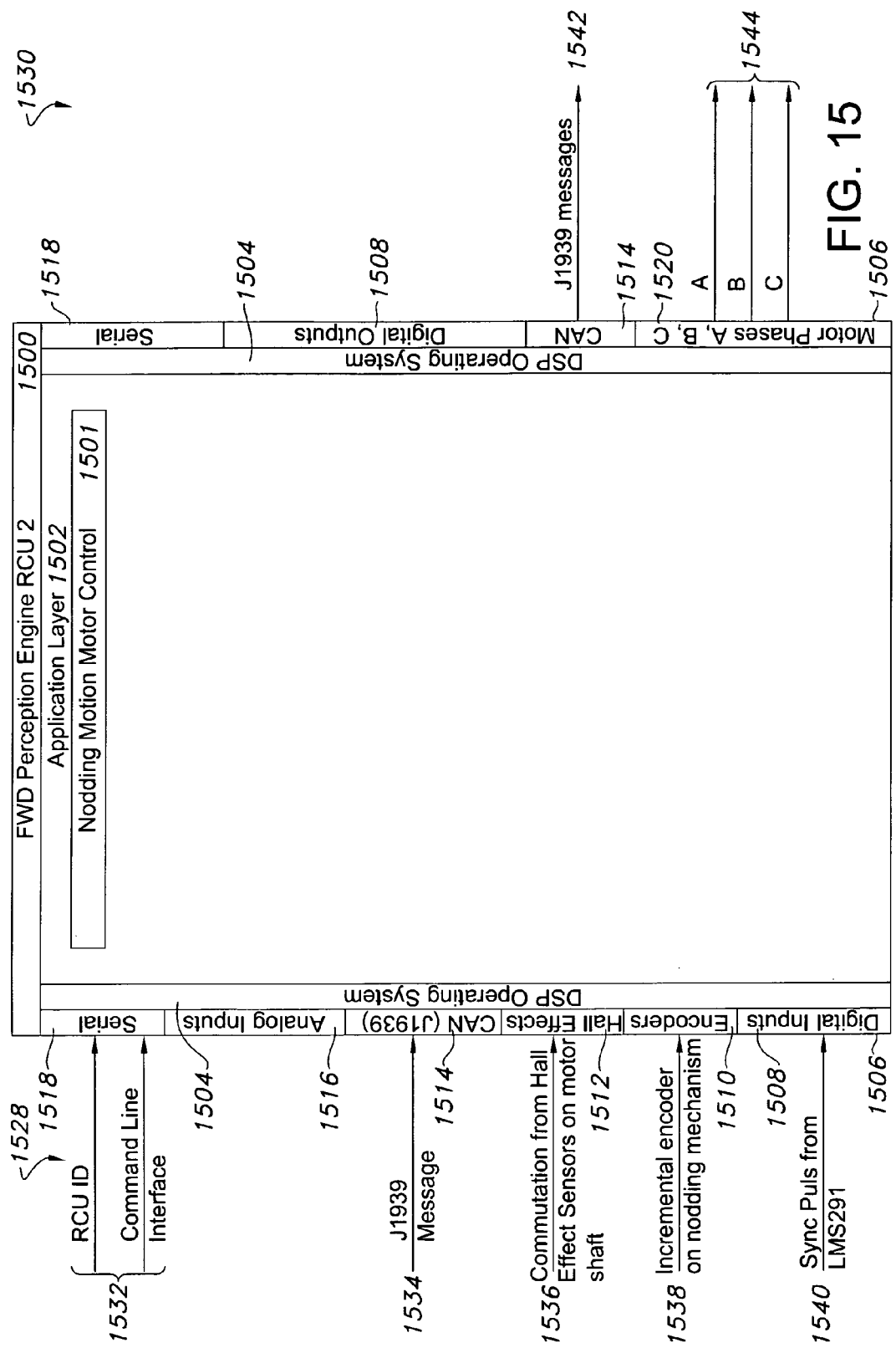
FIG. 15 illustrates a forward perception engine RCU software architecture according to another embodiment of the present invention.

FIG. 15 illustrates a second embodiment of software architecture for a forward perception engine RCU 1500. The software architecture 1500 includes a plurality of software layers. For example, the layers may include an application layer 1502 having applications, a DSP BIOS layer or optional operating system layer 1504 that can include an operating system or other signal processing code, and a network connection layer 1506. An example of an operating system including on the DSP operating system layer 1504 includes a Texas Instruments™ DSP BIOS.

The network connection layer 1506 may include one or more network connectors, such as a digital input and output 1508, encoder connector 1510, hall effect connector 1512, CAN connector 1514, such as a J1939 connector, analog input 1516, serial connector 1518, such as an RS232 or RS422 connector, and motor phases output 1520. The network connectors may be used to receive a plurality of data 1528 or send a plurality of data 1530. Examples of serial data 1532 received by the serial connector 1518 include identification from other RCUs and a command line interface. An example of received CAN data 1534 includes J1939 messages. An example of received hall effects 1536 includes a commutation from Hall effect sensors on motor shafts. An example of receive encoder data 1538 includes incremental encoder data on a nodding mechanism. An example of received digital data 1540 includes a sync pulse from a laser scanner, such as an LMS291 laser scanner. An example of transmitted CAN data 1542 includes J1939 messages. An example of motor phase data 1544 includes three-phase motor phases A, B, and C.

Application on the application layer 1502 may include a nodding motion motor control 1501. The nodding motion motor control 1501 may communicate with a laser nodding actuator or other device using a J1939 protocol and through a CAN bus. The nodding motion motor control may also provide command line debug via the same or different network connection.

Figure 16:
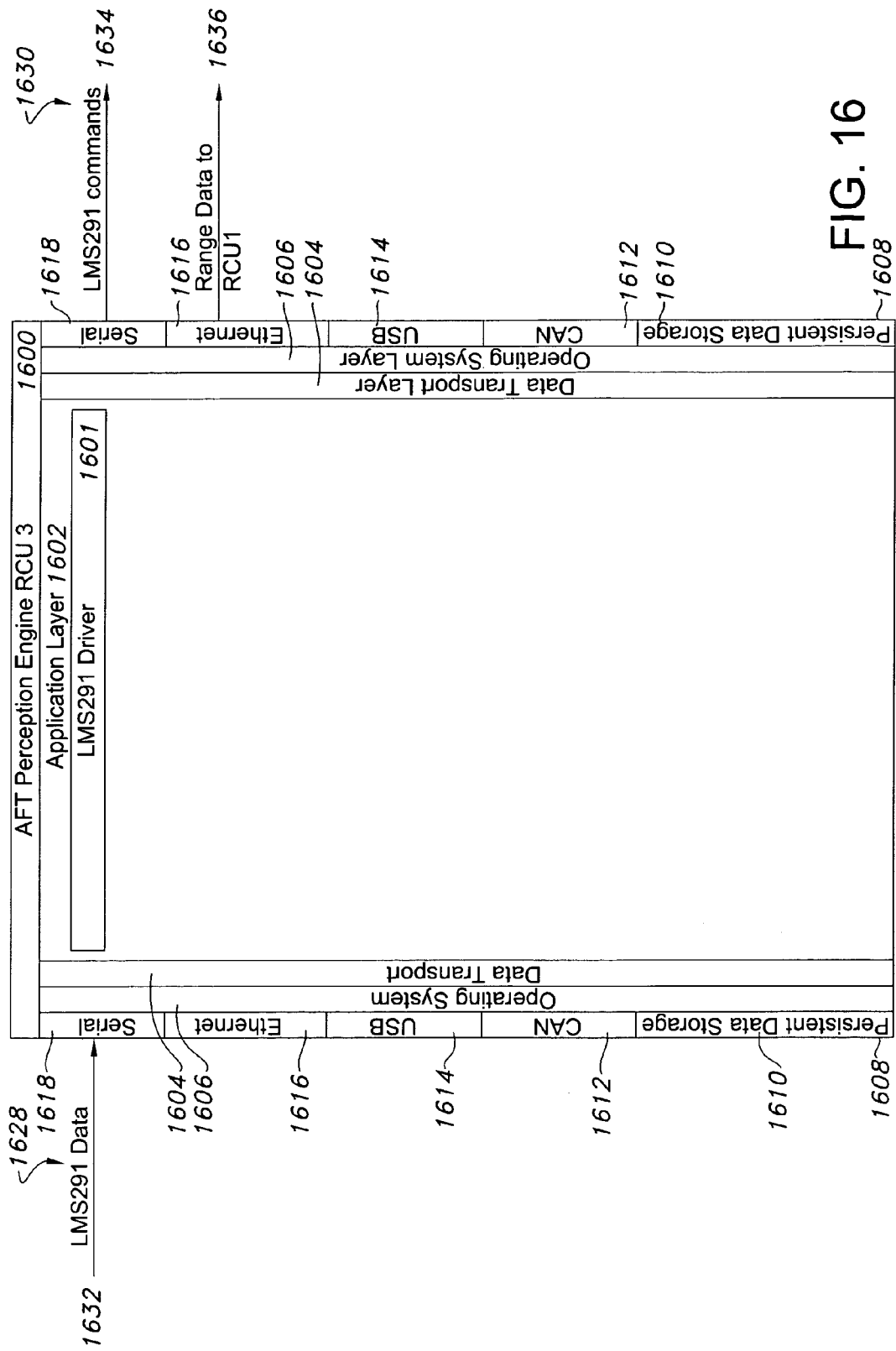
FIG. 16 illustrates a perception engine RCU software architecture according to one embodiment of the present invention.

FIG. 16 illustrates one embodiment of software architecture for a rear perception engine RCU 3 1600. The RCU may become a rear perception engine RCU after being designated as such and receiving the appropriate application code. The rear perception engine software architecture can also include a plurality of software layers, such as an application layer 1502 that includes one or more applications, a data transport layer 1604, an operating system layer 1606 that can include an operating system, such as BlueCat Linux, and a data storage/network connect layer 1608. The data storage/network connect layer 1608 can include a data storage, such as persistent data storage 1610 and one or more network connectors to allow the RCU to send and receive data and other communicate with devices outside of the RCU.

The application layer 1602 may include a laser scanner driver application, such as LMS291 driver 1601, that reads configuration data, configurations the laser scanner for continuous output of range data, reads range data, and publishes the data to a network message queue for use by a supervisory RCU. The application layer 1602 may include similar or the same behavior code, architecture, or otherwise, as the forward perception engine.

Figure 17:
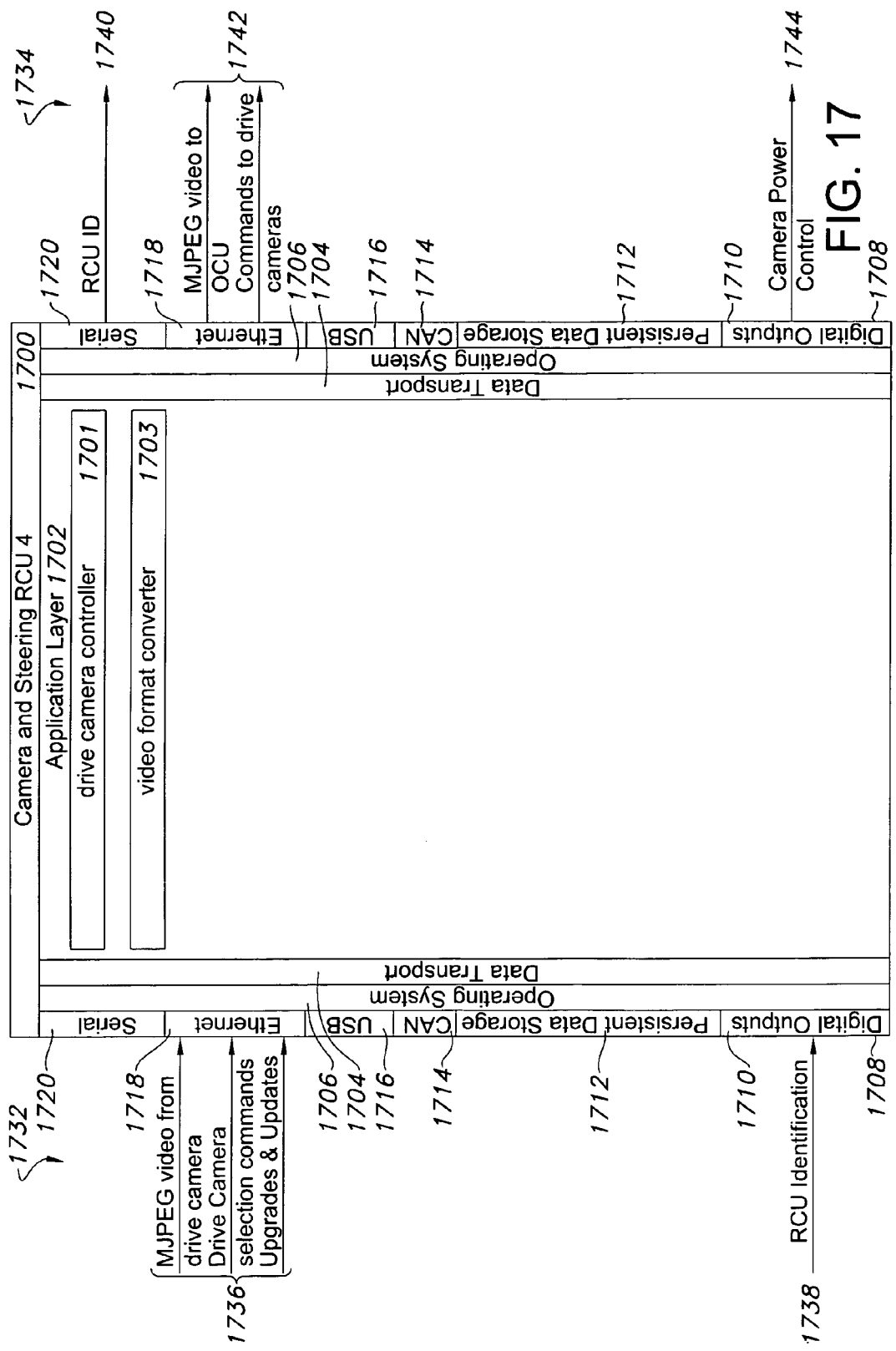
FIG. 17 illustrates a camera and steering RCU software architecture according to one embodiment of the present invention.

FIG. 17 illustrates one embodiment of a software architecture for a camera and steering RCU 4 1700. The camera and steering software architecture 1700 may include a plurality of software layers such as application layer 1702 that can include one or more applications, a data transport layer 1704, operating system layer 1706 that can include an operating system, such as BlueCat Linux, and data storage/network connection layer 1708. The data storage/network connection layer 1708 can include a data storage, such as persistent data storage 1712 and one or more network connectors for sending and receiving data. Example of data received 1732 by the RCU includes video from drive cameras, drive camera selection commands, software upgrades and updates, and an identification from other RCUs. Example of data transmitted 1734 by the RCU can include the RCU's identification, video to an OCU, commands to drive cameras, and camera power control.

The application layer 1702 may include one or more applications, such as drive camera controller 1701 and video format converter 1703. The drive camera controller 1701 can configure a drive camera based on configuration data and commands received over a network, select active drive camera based on commands, disable output from inactive cameras to reduce network load, and/or switch camera power on and off. The video format converter 1703 may read video, such as MJPEG video, from the active drive camera, convert MJPEG video into a subset format, and multicast video stream in the subset format to an OCU.

Figure 18:
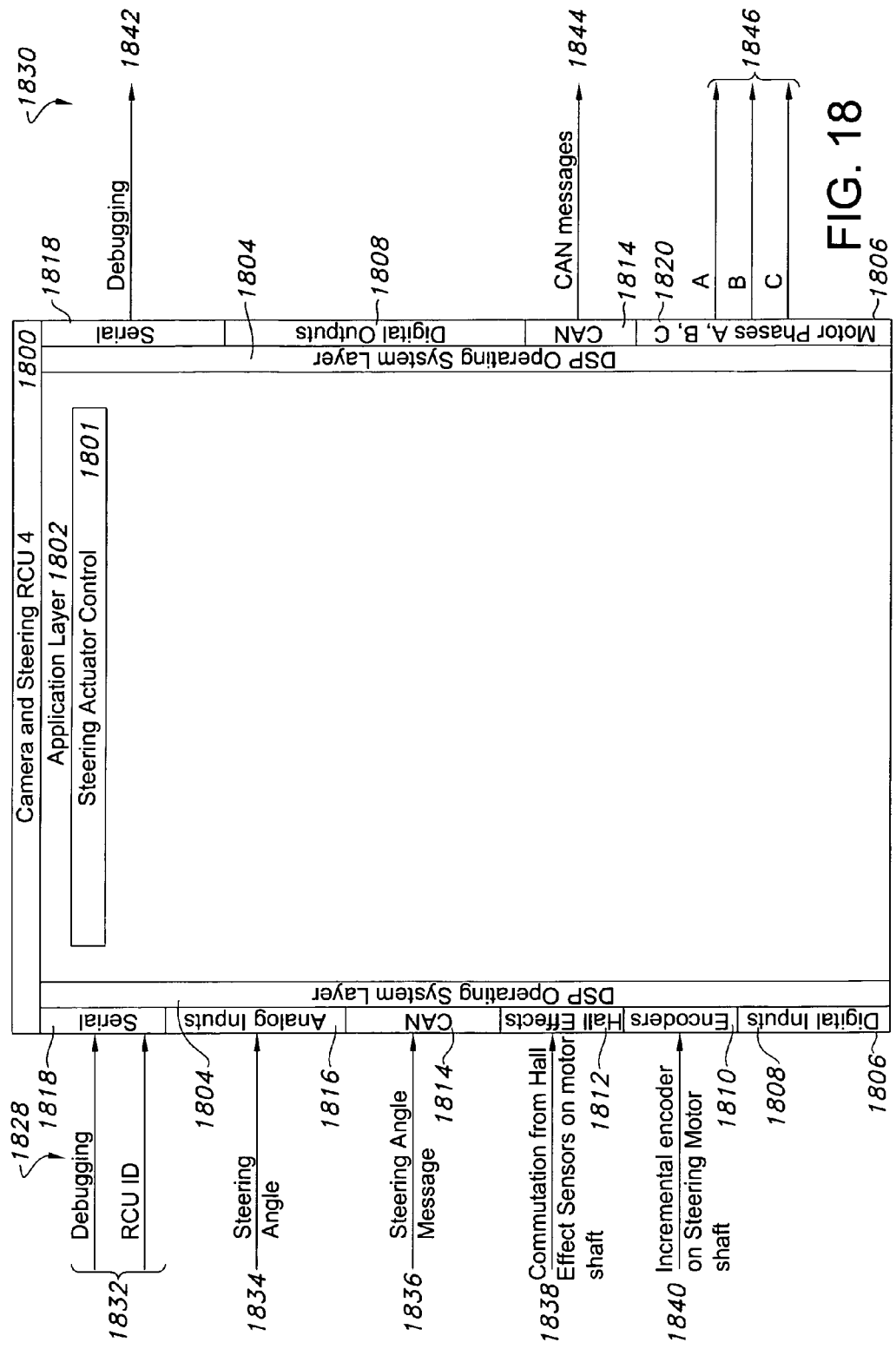
FIG. 18 illustrates a camera and steering RCU software architecture according to another embodiment of the present invention.

FIG. 18 illustrates another embodiment of software architecture for a camera and steering RCU 4 1800. The camera and steering software architecture 1800 can include a plurality of software layers, such as application layer 1802, a DSP operating system layer 1804, and network connection layer 1806. The DSP operating system layer 1804 may include an DSP BIOS or optional operating system. The network connection layer 1806 may include one or more types of network connectors that can be used to receive data 1828 and receive data 1830.

The application layer 1802 may include one or more applications. For example, the applications may include a steering actuator control application 1801. The steering actuator control 1801 can provide command line debug over a first network connector, such as RS232 and communicate with one or more outside devices, such as actuators, over a second network connector, such as a CAN connector using J1939 protocol.

Illustrative Vehicle

Embodiments of the present invention may be used in a variety of vehicles, such as automobiles, trucks, utility vehicles and any other suitable autonomous vehicle. FIGS. 3A and 3B are top view diagrams of an illustrative vehicle in one embodiment of the present invention. The vehicle 300 shown in FIGS. 3A and 3B is a six wheeled, diesel powered utility vehicle, such as a Gator™ model vehicle manufactured by Deere & Company of Moline, Ill. Note that FIGS. 3A and 3B illustrate the vehicle 300 with the dump bed at the rear of the vehicle 300 removed. In some embodiments of the present invention, the dump bed may include payload interfaces that allow the detachable connection of payloads to the vehicle 300 and to the vehicle's control network. The interfaces may be plugs, connectors, couplers, fasteners, or any structure that can allow a payload to attach and detach from the interface with relative ease.

The illustrative vehicle 300 includes a robotic control system having a number of RCUs each contained in a mountable housing. In the embodiment shown in FIGS. 3A and 3B, the robotic control systems has the four RCUs, 238, 244, 254, 262. Other embodiments of the same or different vehicles may have more or less RCUs. The RCUs 238, 244, 254, 262 can be mounted in idle or void spaces in the vehicle 300. In this manner, valuable person or payload space is not taken up by the electronics of the robotic control system. For example, supervisory robotic level controller RCU (#1) 238 is positioned in the engine compartment 302 of the vehicle 300. A heat shield 304 may be used to shield the supervisory robotic level controller RCU (#1) 238 and other electronics 306, 308 from the heat of the engine. In one embodiment, the heat shield 304 can have a seal on its top surface so that it can form a seal with the bottom surface of the dump bed (not shown).

The forward perception RCU (#2) 254 can be positioned on the front laser scanner assembly 310. The rear perception RCU (#3) 244 can be positioned on the rear laser scanner assembly 312. The camera and brake RCU (#4) 262 can be positioned in the hood cavity 314 of the vehicle. The position of the RCUs in the idle spaces shown in FIGS. 3A and 3B are illustrative and a variety of other configurations are possible. Positioning and mounting the RCUs near the devices that they send control signals to and receive signals from can reduce noise interference with these signals. FIG. 3A also illustrates the layout of various other electronic components of the robotic control system of the vehicle 300 according to one embodiment of the present invention. Examples of such other components include a battery equalizer 350, GPS 352, VCU 354, cameras 358, compass 360, radios 362, power center 364, and controller 366.

Camera Mast Unit

Figure 4:
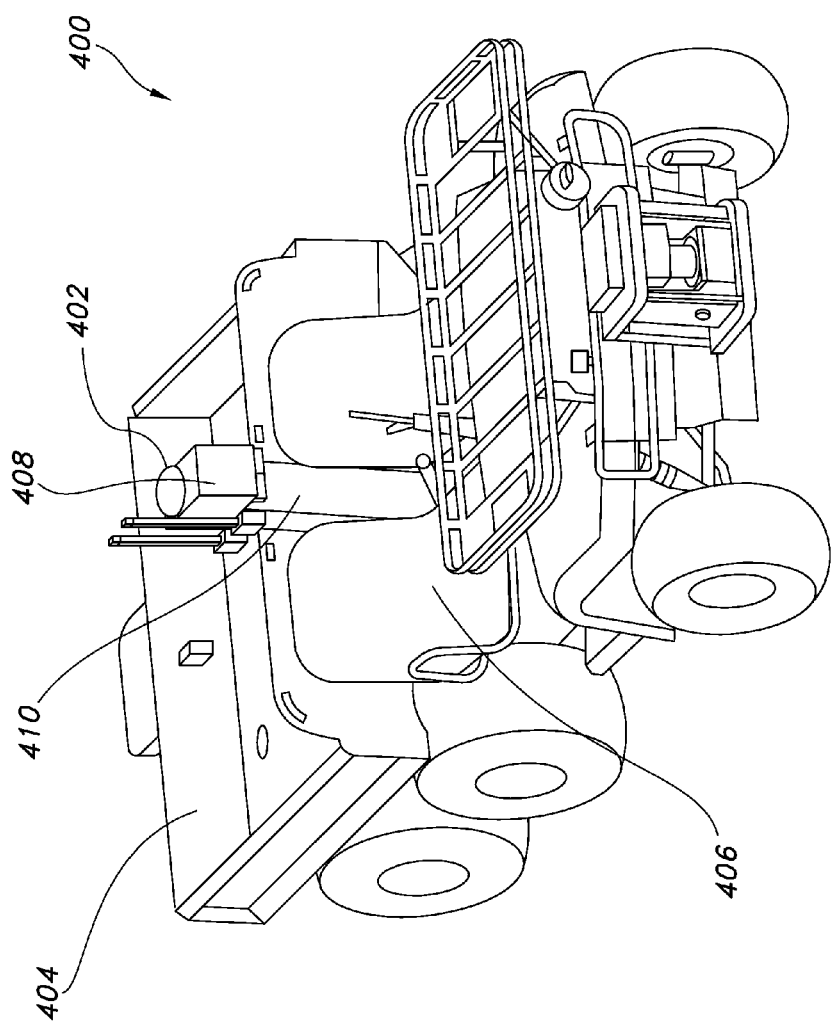
FIG. 4 shows a vehicle having an attached camera mast unit according to one embodiment of the present invention.

Vehicles according to some embodiments of the present invention include a camera mast unit that is detachably connected to the vehicle and an interface to communicate with the vehicle's control system and power source. FIG. 4 illustrates one embodiment of a vehicle 400 having a camera mast unit 402 attached between the vehicle bed 404 and the operator and passenger area 406. The vehicle bed 404 may include payload interfaces for attaching additional payloads to the vehicle 400 and provide the payloads with an interface for communicating with the vehicle's control system.

The camera mast unit 402 includes a camera 408 located at the top of the camera mast unit 402 as a vision sensor for receiving image data and transmitting the image data to the vehicle's control system, such as RCUs 238, 244, 254, 262, or otherwise using the network interface. The image data may be transmitted by the RCU through a radio to an OCU 256, 250 or other remote device. The camera mast unit 402 is at a height such that operators and passengers do not interfere with the camera's 408 ability to receive image data of the vehicle's surroundings. In some embodiments, the camera mast unit 402 is more than three feet high from the interface with the vehicle 400. In some embodiments, the camera mast unit 402 is less than one foot higher than the height of an average passenger while sitting in the passenger area 406.

The camera mast unit 402 may also comprise a chamber 410 for receiving additional electronics or other structure to provide the camera 408 or other vehicle structure with additional functionality. The chamber 410 may include an interface to allow the additional devices to connect to, and communicate with, the camera mast unit 402. The additional devices may include video boards, communication components, amplifiers, a compass, GPS system and 2D and 3D video processors.

The camera mast unit 402 may interface with the vehicle's control system network to, for example, a switch or router included in the vehicle's control system network. The payload interfaces in the vehicle bed 404 may be connected to the same or separate switch or router to, optionally, provide the camera 408 with the ability to communicate directly with payloads connected in the vehicle bed 404. Furthermore, since the camera mast unit 402 connects to the vehicle control system network through an interface and not through a direct connection, the camera mast unit 402 may be easily replaced.

Figure 5B:
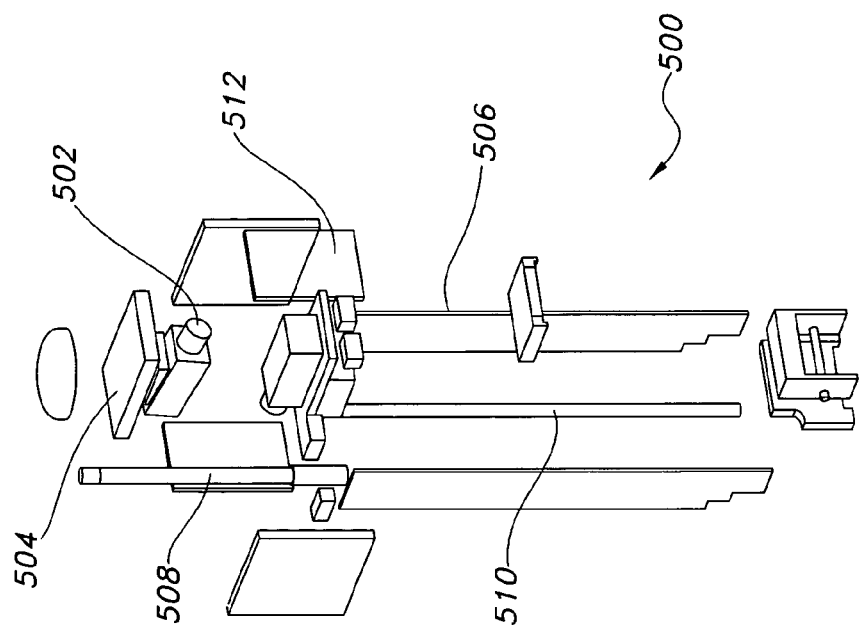
Figure 5C:
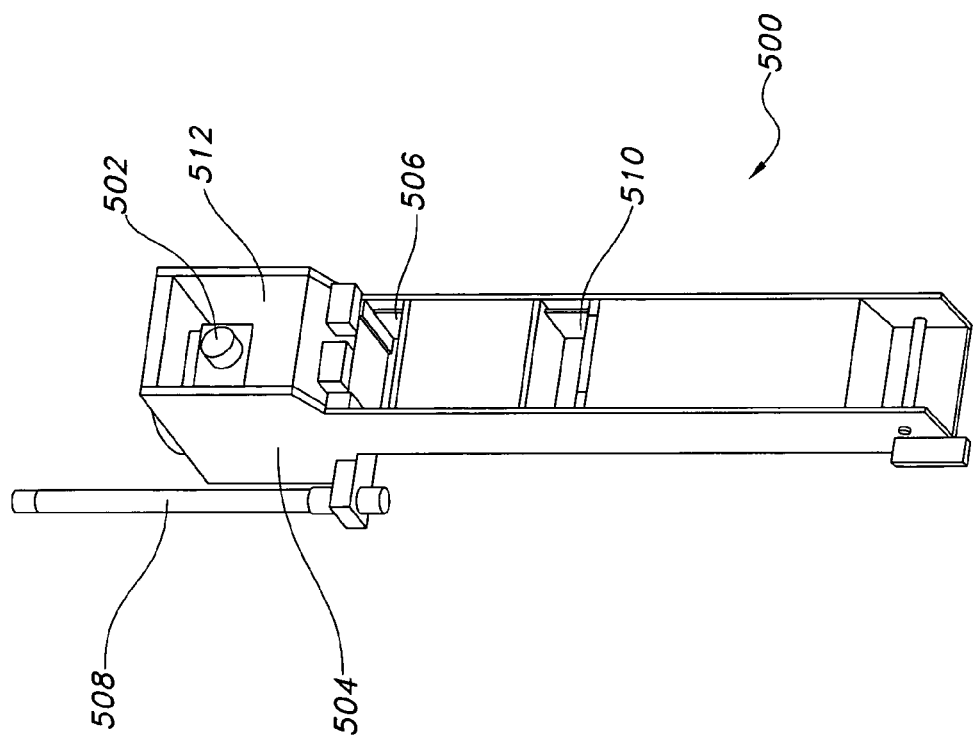

FIGS. 5a-5c show one embodiment of the assembly of a camera mast unit 500. The camera 502 is installed in a camera housing 504 and may be detachably connected to a camera mast base 506. In some embodiments, the camera 502 and the camera housing 504 is a continuous structure. The base 506 may include a network interface to allow the camera 502 to communicate with a camera mast network in the base 506. Antennas 508 are connected to the camera housing 504. The antennas 508 transmit and receive radio signals between the vehicle's control system and control units such as remote OCUs and/or dashboard OCUs.

The camera mast base 506 includes a chamber 510 to receive additional components and devices. The additional components and devices may be associated with facilitating camera 502 functionality. In some embodiments, the additional components and devices may be associated with other vehicle functions, such as, for example, additional data processing capabilities and payload support. One or more protective lenses 512 may be connected to the camera housing 504 to prevent damage to the camera 502 and/or provide the camera 502 with additional focusing capabilities. In some embodiments, the camera 502 may connect to the camera unit base 506 using a swivel interface, such that the camera 502 and camera housing 504 are able to controllably rotate relative to the camera unit base 506.

Illustrative Example

The following is an example of using the components of certain embodiments of the present invention to perform various vehicle operations. A vehicle may be provided that can operate in manual, autonomous, and robotic control modes having payload interfaces in the vehicle bed and a camera mast unit interface between the vehicle bed and the driver and operator seats. A vehicle operator may inspect the vehicle to determine whether the task of transporting individuals into an area that may contain dangerous chemicals and returning to a starting point without the individuals requires the payloads attached to the vehicle and the vehicle's control network through the interfaces.

Transporting individuals into an area that may contain dangerous chemicals may require a chemical detection payload and, at least in some instances, offensive apparatuses such as automatic and/or remote controllable artillery. If there are no payloads and/or if there are other payloads besides those required for the particular task attached to the vehicle, the operator can quickly detach the payloads at the payload interfaces and attach the required payloads to the payload interfaces. When the payloads are attached, they may connect to an interface having a plurality of pins that can communicate on the vehicle's control system's CAN and/or Ethernet networks with an RCU and/or VCU. Interface pins may also connect the payloads to a power source, such as the vehicle's power source.

A camera mast unit may be connected to the payload interface between the vehicle bed and driver/passenger area. The camera mast unit can rise four feet above the interface to allow a camera to receive images of the vehicle's surrounding. The camera unit interface may include pins that connect to the camera mast unit to the vehicle's control system and/or power source. The camera mast unit may also include video processor boards detachably connected in the chamber. If the operator, during the inspection, determines that the processor boards are inadequate for the particular task and/or are damaged, the operator can quickly remove the processor board and install a replacement. The camera processor can send data through the camera mast unit interface to the vehicle's control system. The vehicle control system may send the camera data wirelessly to a remote OCU, such as a laptop, by sending the data back to the camera mast unit to antennas attached to the camera mast unit. A remote OCU operator may receive the camera data and make adjustments to the vehicle's control during any stage of the operation.

Once the operator has inspected the vehicle and installed the appropriate payloads and/or camera mast unit components, the operator can use a dashboard OCU located on the vehicle's dashboard and close to the manual mode controls to command the vehicle to operate in a teach and playback mode to, for example, record GPS waypoints and vehicle movements during a first trip segment. A remote operator may receive vehicle and mode data from the vehicle on a wireless network and display the data to a remote operator. The remote operator can, in conjunction with the dashboard OCU user or otherwise, transmit control commands to the vehicle control system. The dashboard OCU communicates with the vehicle's control system by sending commands entered by the operator to an RCU and/or VCU over the vehicle control system network. The RCU and/or VCU may send data, such as status information, to the dashboard OCU for display to the operator. The RCU and/or VCU utilizes a virtual terminal protocol to transmit CAN data that the dashboard OCU can display over an Ethernet network by encapsulating groups of CAN data bytes into Ethernet packets and sending the Ethernet packets over the Ethernet network. The dashboard OCU receives the Ethernet packets and can remove CAN data from the Ethernet packets and display the data to the user.

The operator inside the vehicle and/or the person operating a remote OCU can then control the vehicle in manual or autonomous mode by, for example, inputting the appropriate commands into the dashboard OCU or remote OCU. When the operator arrives at the scheduled destination, the operator inputs a command into the dashboard OCU for the vehicle to playback the GPS waypoints and return to its starting position by following recorded GPS waypoints from last to first. The dashboard OCU communicates command to the vehicle's control system which controls the various vehicle components to return to its starting position.

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

The invention claimed is:

1. A system comprising:
a vehicle control system configured for controlling an autonomous vehicle, receiving payload data from a payload, and transmitting a control signal on at least one network, the payload data from the payload being Controller Area Network (CAN) data;
a payload interface configured for detachably connecting, physically and communicatively, to the payload, detachably connecting, physically and communicatively, to another payload that is a different type of payload than the payload, receiving the control signal from the vehicle control system over the at least one network, providing the control signal to the payload, and providing a power source connection configured to carry power to the payload; and
an operator control unit on the autonomous vehicle, the operator control unit being adapted for receiving the payload data in a different protocol format through the at least one network, displaying a representation of CAN data encapsulated into the different protocol format, and providing through the at least one network control commands for controlling operation of the payload,
wherein the vehicle control system is configured for encapsulating the payload data that is CAN data into the different protocol format, and
wherein the vehicle control system is configured for transmitting the payload data encapsulated into the different protocol format over the at least one network.

2. The system of claim 1, wherein the payload interface comprises at least one of an Ethernet port, a CAN port, or an RS232 port.

3. The system of claim 1, wherein the at least one network comprises a Controller Area Network and an Ethernet network.

4. The system of claim 3, wherein the vehicle control system is capable of encapsulating the payload data that is CAN data into the different protocol format by encapsulating the CAN data into at least one Ethernet packet.

5. The system of claim 1, wherein the at least one network comprises a wireless connection.

6. The system of claim 1, wherein the payload is configured to connect with a power source on the autonomous vehicle through the payload interface.

7. The system of claim 6, wherein the payload connects with the power source by the power connection in the payload interface, the power connection comprising at least one of plugs, connectors, adapters, couplers, or fasteners.

8. The system of claim 1, wherein the payload interface is in a trunk or a trunk bed of the autonomous vehicle.

9. The system of claim 1, wherein the payload comprises at least one of a mast, a chemical detection system, a laser scanner, a camera, a radio, or a Global Positioning System unit.

10. The system of claim 1, wherein the payload interface comprises a switch capable of controlling a power level of the power provided to the payload.

11. The system of claim 10, further comprising at least one multi-voltage switchable power supply controllable by a circuit and configured for providing the power, wherein the circuit is configured for connecting the at least one multi-voltage switchable power supply to the at least one network.

12. The system of claim 1, further comprising:
a first connector to the at least one network, the first connector being in a passenger compartment of the autonomous vehicle; and a second connector to the at least one network, the second connector being in a payload bay of the autonomous vehicle, wherein the first connector is configured for allowing a passenger in the passenger compartment to communicate with a network device using at least one of a protocol of the at least one network or the CAN data encapsulated into the different protocol format, the network device being connected to the second connector in the payload bay.

13. A system comprising:

a payload interface configured for (i) detachably coupling, physically and communicatively, to different types of payloads, (ii) receiving payload data from a payload detachably coupled to the payload interface, (iii) providing a power source connection through which power is provided to the payload detachably coupled to the payload interface, and (iv) providing the payload data as Controller Area Network (CAN) data to at least one network;

a vehicle control system in communication with the payload interface through the at least one network, the vehicle control system being configured for controlling an autonomous vehicle and encapsulating the CAN data of the payload data into at least one Ethernet packet, wherein the vehicle control system is adapted to transmit the at least one Ethernet packet over the at least one network; and an operator control unit on the autonomous vehicle, the operator control unit being configured for receiving the at least one Ethernet packet from the at least one network, displaying a representation of the CAN data encapsulated into the at least one Ethernet packet, and providing through the at least one network control commands for controlling operation of the payloads.

14. The system of claim 13, wherein the payload interface comprises at least one of an Ethernet port, a CAN port, or an RS232 port.

15. The system of claim 13, wherein the at least one network comprises a Controller Area Network and an Ethernet network.

16. The system of claim 15, wherein the at least one network comprises a wireless connection.

17. The system of claim 13, wherein the payload is configured to connect with a power source on the autonomous vehicle through the payload interface.

18. The system of claim 13, wherein the payload interface is in a trunk or a trunk bed of the autonomous vehicle.

19. The system of claim 13, wherein the payload comprises at least one of a mast, a chemical detection system, a laser scanner, a camera, a radio, or a Global Positioning System unit.

20. The system of claim 13, wherein the vehicle control system is further capable of transmitting a control signal on the at least one network to the payload.

21. The system of claim 13, wherein the payload interface comprises a switch capable of controlling a power level of the power provided to the payload detachably coupled to the payload interface.

22. The system of claim 21, wherein the power is provided proximate an Ethernet network port.

23. The system of claim 13, further comprising:

a first connector to the at least one network, the first connector being in a passenger compartment of the autonomous vehicle; and a second connector to the at least one network, the second connector being in a payload bay of the autonomous vehicle, wherein the first connector is configured for allowing a passenger in the passenger compartment to communicate with a network device using at least one of a protocol of the at least one network or the CAN data encapsulated into the different protocol format, the network device being connected to the second connector in the payload bay.

24. The system of claim 13, wherein the operator control unit comprises a first connector to the at least one network, the system further comprising:

a second connector to the at least one network, the second connector being in a payload bay of the autonomous vehicle, wherein the first connector allows an operator that is remote from the autonomous vehicle to communicate with a network device using at least one of a protocol of the at least one network or the CAN data encapsulated into the different protocol format, the network device being connected to the second connector in the payload bay.

25. The system of claim 13, wherein the operator control unit comprises a first connector to the at least one network, the system further comprising:

a second connector to the at least one network, the second connector being in a payload bay of the autonomous vehicle; and a third connector to the at least one network, the third connector being in a passenger compartment of the autonomous vehicle, wherein a first network device connected to the at least one network through one of the first connector, the second connector, and the third connector is configured for communicating with a second network device connected to the at least one network through another one of the first connector, the second connector, and the third connector using at least one of a protocol of the at least one network or the CAN data encapsulated into the different protocol format.

* * * * *